United States Patent [19]

Yamashiro et al.

[11] 4,428,040
[45] Jan. 24, 1984

[54] LOW POWER CONSUMPTION ELECTRONIC CIRCUIT

[75] Inventors: Osamu Yamashiro, Tokorozawa; Toyohiko Hongo, Kodaira, both of Japan

[73] Assignee: Hitachi, Ltd., Tokyo, Japan

[21] Appl. No.: 292,584

[22] Filed: Aug. 13, 1981

[30] Foreign Application Priority Data

Oct. 1, 1980 [JP] Japan .................. 55-135872

[51] Int. Cl.³ .............................................. H02M 3/06
[52] U.S. Cl. ....................................... 363/62; 368/204
[58] Field of Search ................... 307/109, 110; 363/62; 368/203, 204

[56] References Cited

U.S. PATENT DOCUMENTS 4,094,137  6/1978  Morokawa .
4,205,369  5/1980  Asano ................................. 363/62
4,308,609  12/1981  Tamaki .......................... 363/63 X

FOREIGN PATENT DOCUMENTS 2347404  4/1974  Fed. Rep. of Germany .
2633512  2/1977  Fed. Rep. of Germany .
2643455  4/1977  Fed. Rep. of Germany .
2828017  2/1979  Fed. Rep. of Germany .
2950948  6/1981  Fed. Rep. of Germany .
593510   12/1977  Switzerland .
617817   6/1980  Switzerland .
618568   8/1980  Switzerland .
1355009  5/1974  United Kingdom .
1483381  8/1977  United Kingdom .
2001459  1/1978  United Kingdom .
2061645  5/1981  United Kingdom .
2064832  6/1981  United Kingdom .

Primary Examiner—William M. Shoop
Attorney, Agent, or Firm—Antonelli, Terry & Wands

[57] ABSTRACT

According to the present invention, the voltage of a battery is supplied to an electronic circuit such as a watch circuit through a step down circuit which is constructed of capacitors and switching MIDFETs. The step down circuit performs a current converting operation as well as a voltage converting operation. The operating current of the electronic circuit is reduced by the reduction in the operating voltage of the same. As a result that the operating current level of the electronic circuit is dropped and that the current conversion is performed by the step down circuit, the battery current is relatively largely dropped. The construction thus far described elongates the lifetime of the battery. According to the present invention, therefore, there is provided a circuit which is proper for driving the step down circuit.

31 Claims, 23 Drawing Figures

LOW VOLTAGE DETECTING PERIOD

LOW POWER CONSUMPTION ELECTRONIC CIRCUIT

BACKGROUND OF THE INVENTION

The present invention relates to a low power consumption electronic circuit, and more particularly to a low power consumption electronic circuit which is operated by the voltage of a battery.

An electronic circuit such as an electronic watch to be driven by a battery is required to be of low power consumption with a view for elongating the lifetime of the battery.

Generally speaking, a circuit such as an electronic circuit (which will be shortly referred to as an "CMOS circuit"), which is constructed of complementary type insulated gate field effect transistors, can have its current consumption reduced by dropping the power supply voltage to be impressed thereon.

Consequently, the power to be consumed by an electronic circuit as a whole can be reduced by operating the circuit not with the power supply voltage, which is directly supplied from the battery, but with such a power supply voltage at a relatively low level as is fed out of a low current consumption type voltage regulator itself, for example.

In the above case, however, between the input and output terminals of the voltage regulator, there appears a voltage at such a level as is equal to the difference between the battery voltage and the power supply voltage supplied to the electronic circuit, and there flows a current which is substantially equal to that consumed in the electronic circuit.

As a result, a relatively high power consumption takes place in the voltage regulator.

On the other hand, the current to be fed out of the battery is reduced substantially to an extent equal to the reduction in the current consumed by the electronic circuit. As a result, it is difficult to remarkably elongate the lifetime of the battery.

SUMMARY OF THE INVENTION

It is, therefore, an object of the present invention to provide a novel and practical electronic circuit which includes a step down circuit.

Another object of the present invention is to provide a novel electronic circuit which includes a low power consumption type step down circuit ifself.

Still another object of the present invention is to provide a novel electronic circuit which includes a step down circuit and a starting circuit having a desired construction.

A further object of the present invention is to provide an electronic circuit which can substantially reduce the number of its elements for operating the step down circuit.

A further object of the present invention is to provide an electronic circuit which includes a stabilized power supply circuit having a low power consumption and a low output impedance.

A further object of the present invention is to provide an electronic circuit which includes a stabilized power supply circuit having low fluctuations in its output voltage.

A further object of the present invention is to provide an electronic circuit which can satisfactorily operate even the voltage of the power supply such as a battery is dropped.

A further object of the present invention is to provide an electronic circuit which includes a smaller number of capacitors than prior circuits.

A further object of the present invention is to provide a novel electronic circuit which is suitable for use with an electronic watch.

A further object of the present invention is to provide an electronic type watch which has its power consumption reduced by having the stabilized power supply circuit incorporated thereinto.

A further object of the present invention is to provide a stabilized power supply circuit which is suitable for use with a battery power supply having a high electromotive force such as a lithium battery.

The other objects of the present invention will become apparent from the following description made with reference to the accompanying drawings.

DESCRIPTION OF THE PREFERRED EMBODIMENTS

The present invention will now be described in detail in connection with the embodiments thereof.

Figure 1:
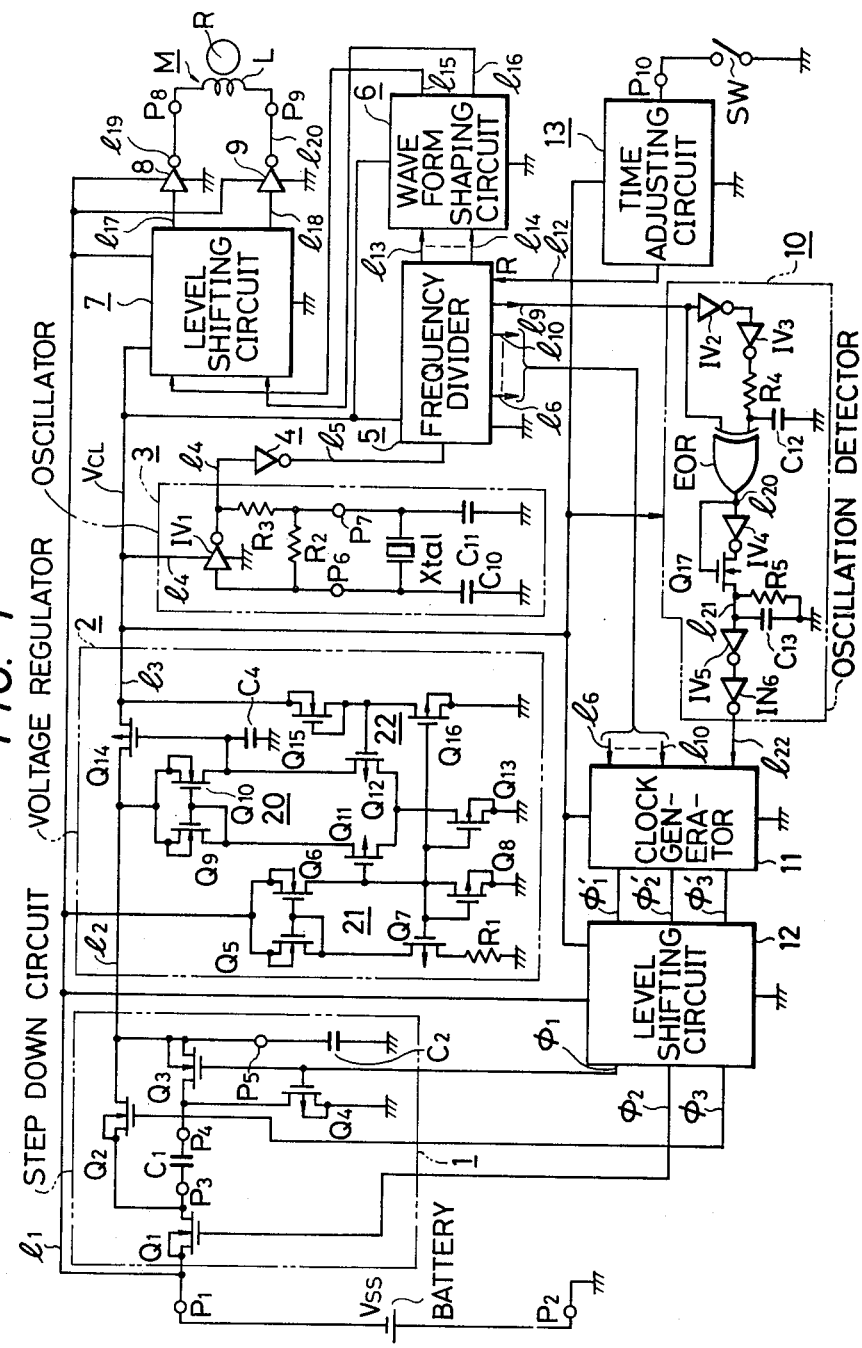
FIG. 1 is a circuit diagram showing one embodiment of the present invention.

FIG. 1 shows both a stabilized power supply circuit according to one embodiment, in case the present invention is applied to an analog type electronic wrist watch a where in the form of a circuit diagram and the analog type electronic watch in the form of a block diagram.

In the embodiment to be described, there is used as a battery power supply $V_{SS}$ a lithium battery which has a higher storage energy per unit volume than that of a silver oxide battery or the like.

Elements shown of the respective circuits are constructed, although not limited thereto, on a single semiconductor substrate by the well-known CMOS (which is the abbreviation of "complementary type metal oxide semiconductor") integrated circuit technique except the battery power supply $V_{SS}$, capacitors $C_1$, $C_2$, $C_{10}$ and $C_{11}$, a quartz crystal unit $X_{tal}$, a switch SW and a stepping motor M.

The semiconductor substrate is constructed, although not shown, of n type single-crystalline silicon, for example. On the semiconductor substrate, there are formed p-channel type insulated gate field effect transistors (which will be shortly referred to as "MISFETs"). On the semiconductor substrate, moreover, there is formed a p-type well region which in turn is formed with n-channel MISFETs.

The plural MISFETs of the same conduction type are simultaneously fabricated by the semiconductor integrated circuit device fabricating technique so that they have substantially the same threshold voltages.

Letters $P_1$ to $P_{10}$ appearing in FIG. 1 indicate the external terminals of the semiconductor integrated circuit device.

Reference numeral 1 indicates a step down circuit which makes use of charged capacitors. The step down circuit 1 is constructed, as shown, of: a switching MISFET $Q_1$, a capacitor $C_1$, a switching MISFET $Q_3$ and a capacitor $C_2$, which are connected in series between the battery voltage terminal $P_1$ and the ground potential terminal $P_2$; a switching MISFET $Q_2$ which is connected in parallel with a series circuit consisting of the capacitor $C_1$ and the switching MISFET $Q_3$; and a switching MISFET $Q_4$ which is connected in parallel with the series circuit consisting of the switching MISFET $Q_3$ and the capacitor $C_2$.

The respective switching MISFETs $Q_1$ to $Q_4$ are of the n-channel type, as shown, in a manner that the battery voltage supplied to the terminal $P_1$ has a negative polarity, and p-type well regions, (although not shown) which are independent of one another, are formed as the semiconductor integrated circuit.

In order to minimize the voltage drop due to the substrate effect, although not especially limitative, the switching MISFET $Q_1$ has its substrate gate, i.e., its p-type well region electrically connected with the power supply terminal $P_1$, whereas the switching MISFET $Q_2$ has its substrate gate electrically connected with the terminal $P_3$. Likewise, the switching MISFET $Q_3$ has substrate gate electrorically connected with the terminal $P_5$.

The semiconductor substrate acting as a common substrate gate for both the p-channel type switching MISFET $Q_4$ and a variety of p-channel type MISFETs for constructing such various circuits as will be described hereinafter is electrically connected with the ground potential terminal $P_2$.

The capacitors $C_1$ and $C_2$ are required to have a relatively large capacity such as 0.001 $\mu$F to 0.1 $\mu$F because their respective charge voltages are used as the power supply voltage to be supplied to a later-described voltage regulator 2. It is, however, difficult to incorporate the capacitors having large capacitors into a semiconductor integrated circuit (which will be here after to be referred to as "IC"). In the embodiment being described, therefore, the capacitors $C_1$ and $C_2$ are attached to the IC through the external terminals $P_3$, $P_4$ and $P_5$.

The switching MISFETs $Q_1$ and $Q_4$ have their gates supplied with the output clock pulses $\phi_1'$ to $\phi_3'$ of a clock generator 11 via a later-described level shifting circuit 12.

The switching MISFET $Q_1$ and $Q_3$ are simultaneously rendered conductive by clock pulses $\phi_2$ and $\phi_1$, respectively, whereas the switching MISFETs $Q_2$ and $Q_4$ are simultaneously rendered conductive by the clock pulses $\phi_3$ and $\phi_1$ during a time period different from that while the former switching MISFETs $Q_1$ and $Q_3$ are conductive.

Figure 2A:
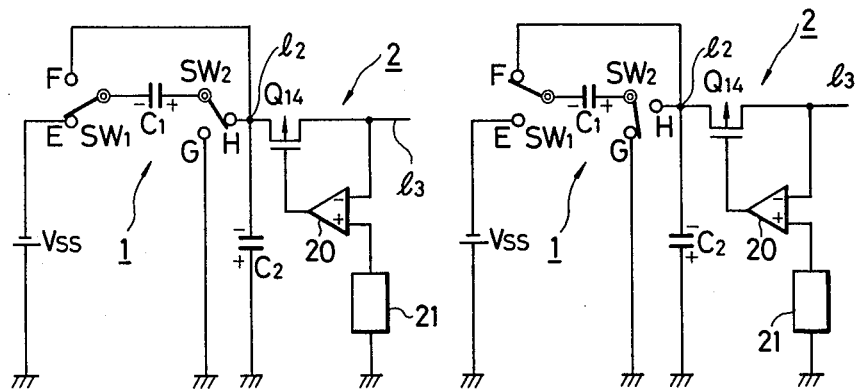
FIGS. 2A and 2B are diagrams illustrating the operating principle of the same.
Figure 2B:
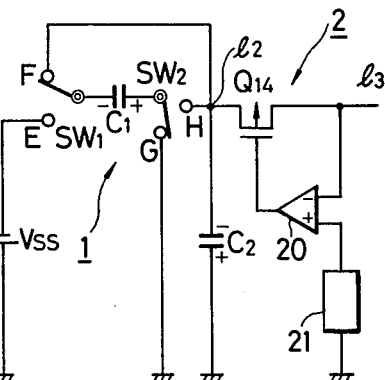

FIGS. 2A and 2B are diagrams for illustrating the operating principle of the step down circuit 1.

The capacitors $C_1$ and $C_2$ are connected in series, as shown in FIG. 2A, as a result that the switching MISFETs $Q_1$ and $Q_3$ are rendered conductive. At this state, the capacitors $C_1$ and $C_2$ of the series connected are charged by the voltage of the battery power supply $V_{SS}$.

The capacitors $C_1$ and $C_2$ are connected in parallel, as shown in FIG. 2B, as a result that the switching MISFETs $Q_2$ and $Q_4$ are rendered conductive.

The output voltage of the step down circuit 1 is attained from between the terminals of the capacitor $C_2$.

By making the capacitances of the capacitors $C_1$ and $C_2$ so relatively large as has been described in the above, the output voltage of the step down circuit 1 at the state of FIG. 2A takes such a value as is substantially determined both by the voltage of the battery power supply and by the voltage dividing ratio determined by the capacitors $C_1$ and $C_2$, whereas the output voltage of the step down circuit 1 at the sate of FIG. 2B takes such a value as is determined by both the composed parallel capacitance and the stored charges of the capacitors $C_1$ and $C_2$.

By making the capacitances of the capacitors $C_1$ and $C_2$ equal to each other, the output voltage of the step down circuit 1 at the state of FIG. 2A and the output voltage of the step down circuit 1 at the state of FIG. 2B can be reduced to a substantially identical value, i.e., substantially one half as high as the voltage of the battery power supply $V_{SS}$.

By the series-parallel converting operations of the capacitors $C_1$ and $C_2$, as has been described in the above, the current flow out of the battery power supply $V_{SS}$ takes substantially one half high as the current which flows in a later-described voltage regulator.

As is apparent from the operations of the step down circuit 1, the switching MISFETs $Q_1$ and $Q_3$ may be rendered conductive in a manner to complement the switching MISFETs $Q_2$ and $Q_4$. For this purpose, on principle, the switching MISFETs $Q_1$, $Q_3$ and $Q_4$ can be driven by an identical clock pulse, whereas the switching MISFET $Q_2$ can be driven by the clock pulse which has a phase opposite to the clock pulse for driving the MISFETs $Q_1$, $Q_3$ and $Q_4$.

In the case, however, with rising and falling clock pulses, both the switching MISFETs $Q_1$ and $Q_2$ are both the switching MISFETs $Q_1$ and $Q_4$ are simultaneously rendered conductive in a transient manner so that the following disadvantages result.

First of all, if the switching MISFETs $Q_1$ and $Q_2$ are simultaneously rendered conductive, the battery power supply $V_{SS}$ and the capacitor $C_2$ are coupled through those MOSFETs $Q_1$ and $Q_2$. As a result, the charging voltage of the capacitor $C_2$ is raised to a higher value than that which is determined by the voltage dividing ratio of the capacitors $C_1$ and $C_2$. In accordance with the rise in the charging voltage of the capacitor $C_2$, the voltage to be impressed upon the voltage regulator 2 is raised to increase the power loss in itself.

Likewise, when the switching MISFETs $Q_1$ and $Q_4$ are simultaneously rendered conductive, the charging voltage of the capacitor $C_1$ is raised. By the rise of the charging voltage of capacitor $C_1$, the charging voltage of the capacitor $C_2$ is raised when the parallel converting operation is started. As a result, the power loss in the voltage regulator 2 is increased.

In the embodiment under description, in order to prevent the increase in the power loss, the clock pulses $\phi_1'$ to $\phi_3'$ are made to have such timings as are shown in FIGS. 5G to 5I, respectively.

More specifically, when the clock pulse $\phi_1$ is raised at a time $t_{10}$ to such a high level as is substantially equal to the ground potential of the circuit, the clock pulse $\phi_2'$ is raised to a high level at a time $t_{11}$ when a time period $\tau_1$ elapses after the time $t_{10}$. When a time period $\tau_2$ elapses after the clock pulse $\phi_2'$ has been dropped to such a low level as is substantially equal to the voltage $V_{CL}$, the clock pulse $\phi_1'$ is dropped to a low level. Likewise, when a time period $Z_3$ elaspses after the clock pulse $\phi_1'$ has been dropped to the low level, the clock pulse $\phi_3$ is raised to a high level. When a time period $\tau_4$ elapses after the clock pulse $\phi_3'$ has been dropped to a low level, the clock pulse $\phi_1'$ is raised again to the high level.

The output voltage of the step down circuit 1 is supplied to a voltage regulator 2 as will be described in the following.

The voltage regulator 2 receives the output voltage of the step down circuit 1 through its input line $l_2$ thereby to feed out a constant voltage at its output line $l_3$. The output voltage of the voltage regulator 2 is set, although not limited thereto, at such a value as is dropped to near the lower operating limit voltage of each of later-described electronic circuits.

The nominal electromotive voltage of the lithium battery is about 3 V so that the output voltage of the step down circuit is accordingly set at about 1.5 V. Consequently, the operating lower limit voltage of the various circuits is set at 1.2 V, for example.

The voltage regulator 2 is constructed, as shown, of: a p-channel type control MISFET $Q_{14}$ which has its drain coupled to the input line $l_2$ and its source coupled to the output line $l_3$; a differential amplifier 20 for supplying a control voltage to the gate of the control MISFET $Q_{14}$; a reference voltage generator 21 for supplying a reference voltage to the difference amplifier 20; and a level shifting circuit 22.

The reference voltage circuit 21 is constructed, although not limited thereto, of MISFETs $Q_5$ to $Q_8$ and a resistor $R_7$, as shown in FIG. 1.

The MISFET $Q_8$ has its gate and drain connected to generate such a constant voltage between its drain and source that substantially corresponds to the threshold voltage thereof. This constant voltage is supplied to the gate of the MISFET $Q_7$. This MISFET $Q_7$ establishes at its drain a drain current at such a level as is determined by both the constant voltage supplied to the drain thereof and the resistance of a resistor $R_1$ connected with the source thereof.

By the illustrated circuit connections, the drain current of the MISFET $Q_7$ is made to flow to the MISFET $Q_5$ forming a part of a current mirror circuit so that a drain current for biasing the MISFET $Q_8$ is accordingly fed out of the drain of the MISFET $Q_6$.

The output voltage of the reference voltage circuit 21, i.e., the drain voltage of the MISFET $Q_8$ is used as the gate bias voltage of the differential and constant current MISFETS $Q_{11}$ and $Q_{13}$ of the differential amplifier 20 and the constant current MISFET $Q_{16}$ of the level shifting circuit 22.

In the reference voltage circuit 21, incidentally, immediately after the battery power supply is made, i.e., immediately after the battery power source $V_{SS}$ is connected between the terminals $P_1$ and $P_2$, the MISFET $Q_6$ has its gate electrode potential maintained at a potential such as the ground potential for a predetermined time period by the stray capacity of the circuit. The MISFET $Q_6$ is rendered conductive by the voltage between its gate and source. As a result, the reference voltage circuit 21 is activated when the battery power supply is connected.

The level shifting circuit 22 is constructed of the constant current MISFET $Q_{16}$ and a level shifting MISFET $Q_{15}$ of diode connection thereby to generate a voltage at such a level as is dropped to the extent of the threshold voltage of the level shifting MISFET $Q_{15}$ from the voltage at the output line $l_3$.

The differential amplifier 20 is constructed of: the differential MISFETs $Q_{11}$ and $Q_{12}$; a constant current MISFET $Q_{13}$ which is connected with the commonly connected source of the differential MISFETS $Q_{11}$ and $Q_{12}$; and MISFET $Q_9$ and $Q_{10}$ which are connected with the drains of the MISFETs $Q_{11}$ and $Q_{12}$ thereby to construct the current mirror circuit.

In the differential amplifier 20, the common gates of the differential MISFETS $Q_{11}$ and $Q_{12}$ and the drain of the differential MISFET $Q_{12}$ construct a non-inverting input terminal, an inverting input terminal and an output terminal, respectively.

A constant voltage substantially equal to the threshold voltage of the MISFET $Q_8$ is impressed upon the gate of the MISFET $Q_{11}$, which acts as the non-inverting input terminal of that differential amplifier 20, whereas the stabilized output voltage $V_{CL}$ of the MISFET $Q_{12}$, is impressed through the MISFET $Q_{15}$ upon the gate of the MISFET $Q_{12}$, which acts as the inverting input terminal.

The differential amplifier 20 controls the impedance of the MISFET $Q_{14}$ such that the voltage having its level shifted by the threshold voltage of the MISFET $Q_{15}$ becomes equal to the constant voltage generated by the MISFET $Q_8$.

As a result, the stabilized output voltage $V_{CL}$ to be generated at the output line $l_3$ is made to have a value equal to the sum of the voltage between the drain and source of the MISFET $Q_8$ and the voltage having its level shifted by the MISFET $Q_{15}$.

The stabilized output voltage $V_{CL}$ is set, as has been described in the above, at a value close to the operating lower limit voltage of the circuit both by suitably designing the respective sizes of the MISFETs $Q_8$ and $Q_{15}$ and by setting the bias current voltage thereof.

Incidentally, as a result that the respective MISFETs and the respective MISFETs constructing the later-described respective circuits are made to have mutually similar threshold voltages, the stabilized output voltage $V_{CL}$ is automatically set at such a value as is suitable for the power supply voltage for the later-described circuits irrespective of both the dispersion in the absolute values of the threshold voltages of the respective MISFETs and the fluctuations due to the temperature fluctuations.

More specifically, for example in case the operating lower limit voltage of the later-described circuits is increased by the increase in the threshold voltage of the p-channel MISFET of the later-described circuits, for example, the output voltage of the reference voltage circuit 21 is increased by the increase in the threshold voltage of the p-channel MISFET $Q_8$ of diode connection. As a result, a properly raised voltage $V_{CL}$ is fed out of the voltage regulator 2. Likewise, in case the operating lower limit voltage of the later-described circuits is increased by the increase in the threshold voltage of the n-channel MISFET of the later-described circuits, the voltage having its level shifted by the level shifting circuit 22 is increased by the increase in the threshold voltage of the n-channel MISFET $Q_{15}$. As a result, the output voltage $V_{CL}$ is properly raised.

Likewise, in case the operating lower limit voltage of the later-described circuits is dropped, the voltage $V_{CL}$ is also properly dropped.

The circuits 20 to 22 can be operated by a remarkably small bias current such as 10 nA, respectively, by suitably designing their respective MISFETs $Q_5$ to $Q_{16}$ and the resistor $R_1$.

In the described embodiment, with the illustrated circuit connections, the power supply voltage for operating the differential amplifier 20 is supplied from the step down circuit 1, whereas the power supply voltage for operating the reference voltage circuit 21 is supplied directly from the battery power source $V_{SS}$.

If the reference voltage circuit 12 is constructed such that it is operated directly by the battery power supply $V_{SS}$, as has been described hereinbefore, a constant voltage to be used as a satisfactory reference voltage can be fed out of that reference voltage circuit 21 even if the battery voltage is dropped by the consumption of the battery or the like. Incidentally, the reference voltage circuit 21 is sufficient to generate a constant voltage at such a relatively low level as corresponds to the level of the threshold voltage of the MISFET $Q_8$. In order to further reduce the power consumption of the reference voltage circuit 21, therefore, the power supply voltage may be attained from the step down circuit 1 similarly to the differential amplifier 20.

Incidentally, a capacitor $C_4$, which is connected between the gates of the MISFET $Q_{14}$ and the ground point, as shown in FIG. 1, is provided partly to prevent the voltage regulator 2 from oscillating and partly to prevent the fluctuations in the step down voltage generated by the step down voltage 1 from being transmitted to the gate of the MISFET $Q_{14}$ by the overlap capacitance (i.e., the drain-gate capacitance, although not shown) which exists between the drain and gate of the MISFET $Q_{14}$. That capacitance is set at a relatively large value such as 20 pF to 40 pF.

The stabilized output voltage $V_{CL}$ is used as the power supply voltage of such respective circuits as will be described in the following.

Reference numeral 3 indicates an oscillator which is made operative to generate a reference frequency signal of 32768 Hz, for example.

The oscillator 3 is constructed of: an inverter $IV_1$ acting as an amplifier; an oscillation stabilizing resistor $R_3$; a bias resistor $R_2$, the quartz crystal unit $X_{tal}$; and the capacitors $C_{10}$ and $C_{11}$.

Figure 7:
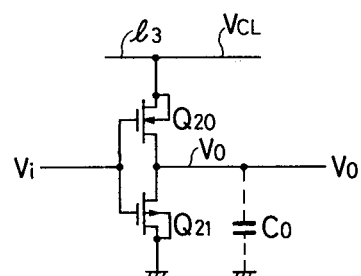
FIG. 7 is a circuit diagram showing an inverter circuit.

The inverter $IV_1$ is constructed, as shown in FIG. 7, of an n-channel type MISFET $Q_{20}$ and a p-channel type MISFET $Q_{21}$, for example, and is operated by the power supply voltage $V_{CL}$ which is supplied from the voltage regulator 2.

Although not limited thereto, the capacitors $C_{10}$ and $C_{11}$ for determining the oscillation frequency together with the quartz crystal unit $X_{tal}$ are selected from those, which have capacitances of a predetermined temperature coefficient, with a view to reducing the temperature coefficient of the oscillation frequency and are constructed as the external parts of the IC.

Figure 8:
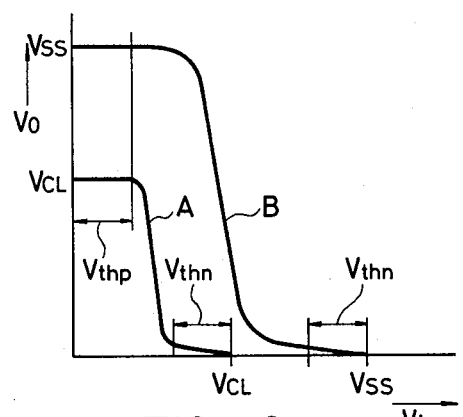
FIGS. 8 and 9 are graphs illustrating the characteristic curves of FIG. 7.

The inverter shown in FIG. 7 is made to have such output voltage characteristics against an input voltage $V_i$ as are indicated by a curve B of FIG. 8 if its operating voltage is made equal to the battery voltage $V_{SS}$.

The p-channel type MISFET $Q_{21}$ is rendered conductive when the input voltage $V_i$ is made higher than the threshold voltage $V_{thp}$ thereof, whereas the n-channel type MISFET $Q_{21}$ is rendered conductive when the input voltage $V_i$ becomes lower than the value which is calculated by subtracting the threshold voltage $V_{thn}$ from the voltage $V_{CL}$ at the line $l_3$. As a result, a through current flows, as indicated by a broken curve B of FIG. 9, through the source-drain passage of the MISFETs $Q_{20}$ and $C_{21}$ of series connection in accordance with the change in the input voltage $V_i$.

On the other hand, for example, in case the conductive and non-conductive states of the MISFETs $Q_{21}$ and $Q_{22}$ are inverted subsequent to the state, at which the potential at an output node $N_o$ is held substantially at the ground potential, by the conductive state of the MISFET $Q_{21}$ and the by the non-conductive state of the MISFET $Q_{20}$, the charging current flows into a capacitor $C_0$, which is coupled to the output node $N_0$, through the MISFET $Q_{20}$ from the line $l_3$.

As a result, the power to be consumed by the inverter shown in FIG. 7 is determined by both the through current, which is established as a result that the MISFETs $Q_{20}$ and $Q_{21}$ are simultaneously rendered substantially conductive, and the charging and discharging currents to and from the capacitor $C_o$.

According to the embodiment under description, the range of the input voltage $V_i$, within which the through current flows in accordance with the reduction in the voltage $V_{CL}$ at the line $l_3$, is narrowed, and the level of the through current itself is reduced.

Moreover, since the changing range of an output voltage $V_0$ is reduced in accordance with the voltage $V_{CL}$ at the line $l_3$, the charging and discharging currents made to flow through the capacitor $C_0$ are reduced.

As a result, the inverter of FIG. 7 has its power consumption reduced.

Figure 9:
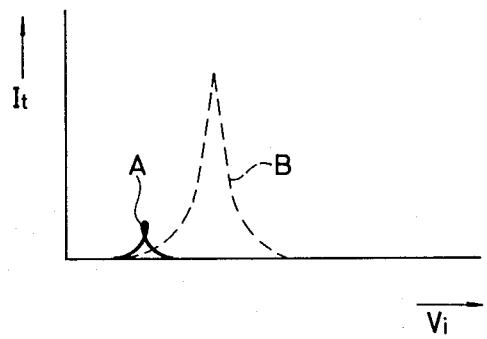

Curve A of FIG. 8 illustrates the output voltage characteristics against the input voltage of the inverter in the case when the output voltage $V_{CL}$ of the voltage regulator 2 is supplied to the line $l_3$. A solid curve A of FIG. 9 illustrates the through current wave forms when the inverter is made to have the characteristics of the curve A of FIG. 8.

The oscillator 3 of FIG. 1 generates a reference frequency signal having a waveform similar to sine wave forms, although is not limited thereto. This reference frequency signal is supplied to the inverter 4 acting as a wave form shaping circuit which is made receptive to the voltage $V_{CL}$ of the line $l_3$ from the power supply.

As a result, the inverter 4 generates the reference frequency signal, which has its wave forms shaped as the pulse signal, in accordance with the sinusoidal reference frequency signal fed out of the oscillator 3.

The output signal of the inverter 4 is supplied through a line $l_5$ to the input terminal of a frequency divider 5.

Figure 4:
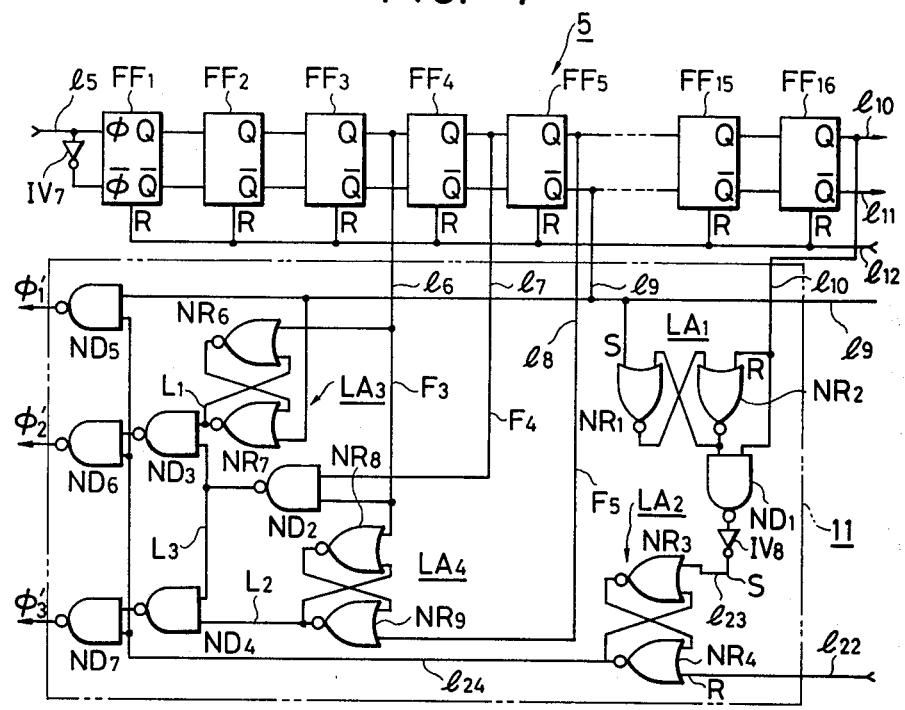
FIG. 4 is a concrete logical circuit diagram showing blocks 5 and 11 of FIG. 1.

The frequency divider 5 is constructed, as shown in FIG. 4, of sixteen series-connected flip-flops FF1 to FF16 and an inverter IV$_7$.

Each of the flip-flops FF 1 to FF16 is so constructed that the output signals at output terminals Q and $\bar{Q}$ are inverted in synchronism with the change of the clock signal which is impressed upon the clock input terminal $\phi$ thereof.

As a result, in accordance with the reference pulse signal of 32768 Hz, which is supplied through the line $l_5$ from the inverter 4 of FIG. 1, a pulse signal of 16384 Hz is generated at the output terminal of the flip-flop FF1, and a pulse signal of 8192 Hz is generated at the output terminal of the flip-flop FF2. Likewise, a pulse signal of 0.5 Hz is generated at the output terminal of the flip-flop FF 16 at the final step.

The output pulse signals at respective frequencies, which are fed out of the frequency divider 5, are supplied through a line $l_{13}$ or $l_{14}$ to a wave form shaping circuit 6.

This wave form shaping circuit 6 is provided to generate a pulse signal for driving the bipolar drive stepping motor M and is constructed of a suitable gate circuit, (not illustrated), which is made receptive of the voltage $V_{CL}$ at the line $l_3$ as the power supply voltage.

Out of the wave form shaping circuit 6, there is fed a pulse signal which has its level raised substantially to the voltage $V_{CL}$ and which is fed alternately every other second to lines $l_{15}$ and $l_{16}$. Although not limited thereto, in order to reduce the average of the drive current flowing into the bipolar drive stepping motor M, the pulse signals of a two second frequency at the line $l_{15}$ and $l_{16}$ have their levels raised to a high level during their one period, e.g., for 15.6 ms.

In the present embodiment under description, incidentally, the signal level, which is stopped substantially to the ground voltage level the (power supply voltage supplied to the external terminal $P_1$ of the IC has the negative polarity), is high, and the signal level of the power supply voltage of the circuit is low.

The output pulse signal of the wave form shaping circuit 6 is supplied through a level shifting circuit 7 to output buffer circuits 8 and 9.

The output pulse signals of the output buffer circuits 8 and 9 are supplied through the external terminals $P_8$ and $P_9$ to the drive coil L of the bipolar drive stepping motor M.

As a result, of the output voltages of the output buffer circuits 8 and 9 being dropped from the high level to the low level for the time period of 15.6 ms every other second, the drive current, having its polarity inverted for one second, is supplied to the drive coil L.

As a result, the rotor R of the stepping motor M is rotated a predetermined rotational angle every second.

The gear trains (not illustrated) of the watch are driven once a second by the rotor R.

The bipolar drive stepping motor M usually requires a drive current as is considerably larger than the operating current of the respective circuits.

In the present embodiment, the output buffer circuits 8 and 9 are so constructed by the illustrated circuit connections that they operate in a manner which uses the battery power supply $V_{SS}$ as a direct power supply.

With the connections thus far described, the load current of the voltage regulator 2 can be reduced, and the drive current of the stepping motor M is not supplied from the voltage regulator 2 so that the voltage $V_{CL}$ at the line $l_3$ can be sufficiently stabilized notwithstanding that the drive current is intermittently generated.

By the connections thus far described, moreover, the power supply voltage of the output buffer circuits 8 and 9 is freed from influences due to the voltage drop which takes place in the voltage regulator 2. Consequently, even at the state in which the voltage of the battery power supply $V_{SS}$ has been relatively dropped, a sufficiently large drive current can be supplied to the stepping motor M through the output buffer circuits 8 and 9.

These output buffer circuits 8 and 9 are constructed of a complementary type inverter as is shown in FIG. 7. When the inverter of FIG. 7 is operated by the battery power supply $V_{SS}$, the input voltage $V_i$ at the level of the battery power supply $V_{SS}$ is required for rendering the n-channel type MISFET $Q_{20}$ sufficiently non-conductive.

The pulse signal fed out of the wave form shaping circuit 6 to the lines $l_{15}$ and $l_{16}$, as has been described in the above, is set to have its low level at that of the stabilized constant voltage $V_{Cl}$.

Therefore, the invention is equipped with the level shifting circuit 7 so as to shift the level of the low level output signal of the wave form shaping circuit 6 to the low level signal at the voltage level of the battery power supply $V_{SS}$.

Figure 6:
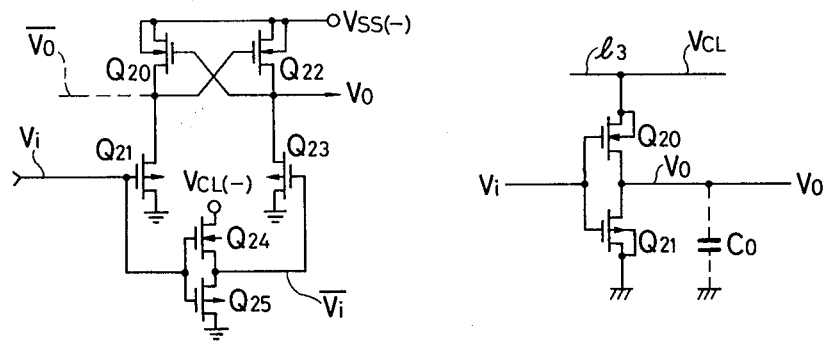
FIG. 6 is a circuit diagram showing a level shifting circuit.

Although not limited thereto the level shifting circuit 7 is constructed, as shown in FIG. 6, has: MISFETs $Q_{20}$ to $Q_{23}$ which are operated by using the voltage $V_{SS}$ as the power supply voltage; and MISFETs $Q_{24}$ and $Q_{25}$ which are operated by using the voltage $V_{CL}$ as the power supply voltage so as to generate an inverted signal in response to the input voltage $V_i$.

Reference numeral 13 indicates a time adjusting circuit, which is made receptive of the signal from the key switch SW through the external terminal $P_{10}$ to feed a line $l_{12}$ with a signal for resetting the frequency divider 5. The time adjusting circuit 13 is constructed to feed the line $l_{12}$ with a high level signal for a predetermined time period irrespective of the operation of the key switch SW when the battery power supply is made.

The clock generator 11 generates the clock pulses $\phi_1'$ to $\phi_3'$ for operating the step down circuit 1, as has been described above.

In place of the invention as described above, the clock generator 11 can have its construction modified to include: an oscillator which is made operative to generate a reference clock by using the battery power supply $V_{SS}$ as a direct power supply; and a logical circuit which is made receptive of the output of the oscillator.

In the embodiment as described, however, the reference clock is supplied from the frequency divider 5 by the circuit connections illustrated in FIG. 1. It therefore becomes unnecessary to provide the oscillator in the clock generator 11 to prevent the undesired increase both in the power consumption of the circuit and in the undesired increase in the number of the circuit elements of the semiconductor integrated circuit device.

Moreover, the clock generator 11 is so constructed that it receives the voltage, which is dropped by the voltage regulator, as the power supply voltage in place of the voltage of the battery power source $V_{SS}$.

Since the low level of the output clock signal of the clock generator 11 is not sufficient for switching the MISFETs $Q_1$ and $Q_2$ of the step down circuit 1, the level shifting circuit 12 is provided.

The level shifting circuit 12 is constructed similarly to the level shifting circuit 7 as is shown illustrated in FIG. 6. The level shifting circuit 12 has a simplified construction which consumes relatively low power.

The clock generator 11 has a complex construction which consumes relatively high power, as is apparent with the specific circuit example of FIG. 4.

Consequently, the construction, in which the power supply voltage of the clock generator 11 is dropped by the step down circuit 1 and the voltage regulator 2 as described above, can have a lower power consumption than the construction, in which the level shifting circuit 12 is eliminated by operating the clock generator 11 directly with the voltage of the battery power source $V_{SS}$.

In the invention as described and the output voltage of the step down circuit 1 is zero, the oscillator 3 is not operated, so no clock pulse is supplied to the step down circuit 1.

In order that a voltage necessary for the operation of the oscillator may appear on the line $l_3$ when the battery power supply $V_{SS}$ is connected, the necessary voltage has to be fed out of the step down circuit 1 even if the oscillator 3 is inoperative.

In the invention as described, the switching MISFETs $Q_1$, $Q_2$ and $Q_3$ have their gate potentials raised to the high level, such as the ground potential of the circuit, at the instant when the power supply is connected by capacitance such as stray capacitance, which is inherent between their respective gates and the ground point of the circuit, so that they are rendered conductive. As a result, the input line $l_2$ of the voltage regulator 2 is supplied with voltage. However, if at least one of the switching MISFETs $Q_1$ and $Q_2$ is rendered non-conductive before the voltage to be supplied to the input line $l_2$ is raised to the desired level, a signal generating circuit such as the oscillator is not supplied with a sufficient operating voltage.

Although not limited thereto, in the invention in order that the voltage at a desired level may be supplied to the line $l_2$ when the battery power supply $V_{SS}$ connection is made, the switching MISFETs $Q_1$ to $Q_3$ of the step down circuit 1 are positively and simultaneously rendered conductive.

As a result, a voltage substantially equal to that of the battery power supply $V_{SS}$ is fed out of the step down circuit 1 so that a predetermined voltage is accordingly fed out of the voltage regulator 2.

The start state, i.e., the state, at which the switching MISFETs $Q_1$ to $Q_3$ are simultaneously rendered conductive, is continued for the time period until the oscillator 3 is rendered sufficient oscillatory. As a result, the starting of the respective circuits of FIG. 1 are ensured.

As a relatively simple way for setting the starting state, there can be made a construction, in which is provided a starting latch circuit as is adapted to be set by the rise of the power supply voltage when the battery power supply is connected and as is adapted to be reset by the rise of the output signal of a predetermined output step of the frequency divider 5, whereby the switching MISFETs $Q_1$ to $Q_3$ are simultaneously rendered conductive on the basis of the output signal of that stating latch circuit.

In the oscillator 3 which is operated by a relatively low voltage as in the invention as described, however, it should be taken into consideration that it takes a relatively long time for the oscillator 3 to be brought into a sufficiently stable oscillatory state after the power supply has been made and that the operation in the oscillator 3 midway of the start of the oscillating operation is relatively unstable by the fluctuations in power supply voltage.

When starting state is ended, the output voltage of the step down circuit 1 starts to drop from a voltage substantially equal to the voltage of the battery power supply $V_{SS}$. In fact, the voltage regulator 2 is not such a perfectly ideal circuit as has its output voltage left unaffected by its input voltage. More specifically, the output voltage of the voltage regulator 2 is slightly dropped in accordance with the reduction in the output voltage of the step down circuit 1 and fluctuates in accordance with fluctuations in the output voltage of the step down circuit 1 as accompany the start of the switching operations of the switching MISFETs $Q_1$ to $Q_4$.

As a result, the oscillatory operation of the oscillator 3 may become unstable immediately after the starting state has ended. If the time period of the clock pulse applied to the step down circuit 1 is changed in accordance with unstableness in the oscillations, the changing amplitude of the output voltage of the step down circuit 1 is accordingly increased, and the oscillatory operation of the oscillator 3 may resultantly be interrupted.

The sequential switching operations of the switching MISFETs $Q_1$ to $Q_4$ of the step down circuit 1 are interrupted by the interruption of the oscillatory operation of the oscillator 3 so that the voltage at the line $l_2$ is further dropped. Here, in the complementary type MISFET circuit of the level shifting circuit 12, as shown in FIG. 6, if the complementary inverter circuit constructed of the MISFETs $Q_{24}$ and $Q_{25}$ is rendered substantially non-conductive by the reduction in the voltage $V_{CL}$ while the MISFET $Q_{22}$ is conductive, the undesired circuit operations are caused, as follows.

More specifically, when the voltage $V_{CL}$ is dropped, the n-channel type MISFET $Q_{24}$ is not rendered conductive even if the input voltage $V_i$ is raised to the high level such as the zero volt. As a result that the MISFET $Q_{24}$ is left non-conductive, the MISFET $Q_{23}$ cannot be rendered conductive.

In the circuit shown in FIG. 1, consequently, if the output voltage $V_{CL}$ of the voltage regulator 2 is dropped to a lower level than the operating lower limit voltage of the complementary inverter by the drop in the voltage at the line $l_2$, the level shifting circuit 12 ceases to generate the clock pulse at such a level as can simultaneously render the switching MISFETs $Q_1$ to $Q_3$ conductive.

As a result, in case where the latch circuit is provided for the simple purpose of the starting operation as described above, in order to start again the oscillatory operation from the state at which the oscillatory operation has ceased, it is necessary to make the starting latch circuit restore its initial state by a process of once removing the battery power source or the like and to release the latch operation with the MISFETs $Q_{22}$ and $Q_{20}$ of the level shifting circuit 12.

In accordance with the invention as described, it is possible to prevent the voltage $V_{CL}$ from being dropped to the undesired level by the provision of an oscillation detector 10 after the power supply connection has been made. As a result, any oscillatory operation of the oscillator 3, which has its operation ceased for the reason, is restarted.

The oscillation detector 10 is constructed, as shown in FIG. 1, of: inverters $IV_2$ to $IV_6$, which are adapted to be operated by the power supply voltage $V_{CL}$ at the line $l_3$; an exclusive OR circuit EOR; resistors $R_4$ and $R_5$; and capacitors $C_{12}$ and $C_{13}$.

The oscillation detector 10 thus constructed is supplied with a predetermined output of the frequency divider 5, e.g., the inverted output $\bar{Q}$ of the flip-flop circuit $FF_5$ of FIG. 4.

The operations of the oscillation detector 10 will now be described with reference to the chart of the operating wave forms of FIG. 3.

At a time $t_0$, the battery power supply $V_{SS}$ connection is made. Since the exclusive OR circuit EOR has its two input terminals receiving the signals at such a high level as is substantially equal to the ground potential, it generates a signal at a low level substantially equal to the power supply voltage $V_{CL}$, as indicated by a wave form C in FIG. 3. The MISFET $Q_{17}$ is rendered non-conductive by the low level output signal of the exclusive OR circuit EOR. The signal at the input terminal of the inverter $IV_5$ acting as the wave form shaping circuit has its level raised to such a high level by the capacitor $C_{13}$ as is substantially equal to the ground potential, as indicated by a wave form E in FIG. 3. The output signal of the inverter $IV_6$ is correspondingly raised to the high level as indicated by a wave form F in FIG. 5.

Figure 3:
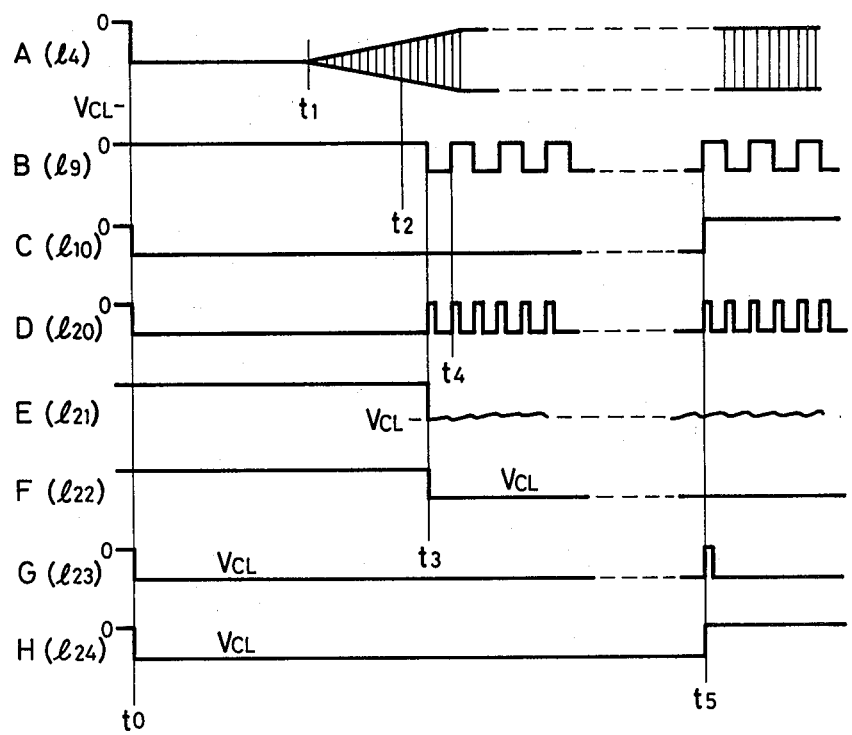
FIG. 3 is a chart illustrating the operating wave forms of the circuit of FIG. 1.

In accordance with the oscillation starting characteristics of the quartz crystal unit $X_{tal}$, the reference frequency signal starts to be fed out of the oscillator 3 at a time $t_1$, as indicated by a wave form A in FIG. 3.

As a result that the amplitude of the output reference frequency signal of the oscillator 3 is made sufficiently large at a time $t_2$, the frequency divider 5 starts to respond to the reference pulse signal which is supplied through the wave form shaping circuit 6.

As a result of a predetermined number of reference pulse signals being applied after the time $t_2$, a signal, which is made to have the low level at a time $t_3$, as indicated by a wave form B in FIG. 3, is fed out of the frequency divider 5 to a line $l_9$.

The exclusive OR circuit EOR is supplied with an input signals which becomes non-coincident for such a delay time period as is determined by a delay circuit including the inverters $IV_2$ and $IV_3$, the resistor $R_4$ and the capacitor $C_{12}$. As a result, the exclusive OR circuit EOR generates a signal having the high level for a time period corresponding to the delay time period.

By the high level signal of the exclusive OR circuit EOR, an MISFET $Q_{17}$ is rendered conductive so that the output signal of the inverter $IV_4$ is made to have the low level. As a result, the capacitor $C_{13}$ is supplied with the low level signal of the inverter $IV_4$ through the MISFET $Q_{17}$. This MISFET $Q_{17}$ is rendered non-conductive in accordance with the fact that the output sginal of the exclusive OR circuit EOR is made to resume the low level. As a result, the low level signal is held in the capacitor $C_{13}$. Likewise, each time the signal level to be supplied from the frequency divider 5 to a line $l_9$ at and after a time $t_4$, the capacitor $C_{13}$ is supplied with the low level signal. As a result, a line $l_{21}$ generates a signal as is indicated by a wave form E in FIG. 3.

In a manner which corresponds to the low level signal at the line $l_{21}$, a low level signal as is indicated by a wave form F in FIG. 3 is fed out of the inverter $IV_6$ to a line $l_{22}$.

The low level signal fed out of the inverter $IV_6$ is the oscillatory operation detecting signal of the oscillator 3.

In the invention as described in order that the oscillatory operation detecting signal may be changed from the low to high level before the output voltage $V_{CL}$ of the voltage regulator 2 is not dropped to the operating lower limit voltage of the circuit such as the clock generator 11 or the level shifting circuit 12 by the oscillation interruption of the oscillator 3 by the reason, the resistor $R_5$ is connected in parallel with the capacitor $C_{13}$.

If the oscillating operation of the oscillator 3 is interrupted as in the case immediately after the starting state has been ended, the step down circuit 1 is made to automatically restore the starting state.

The frequency divider 5 and the clock generator 11 are illustrated in detail in FIG. 4.

The clock generator 11 is constructed of latch circuits $LA_1$ to $LA_4$, NAND circuits $ND_1$ to $ND_7$ and an inverter $IV_8$.

Each of the latch circuits $LA_1$ to $LA_4$ is constructed of two NOR circuits, as illustrated.

The latch circuits $LA_1$ and $LA_2$, the NAND circuit $ND_1$ and the inverter $IV_8$ are a start control circuit.

The high level signal at the line $l_9$ is a set signal of latch $LA_1$, and the high level signal at a line $l_{10}$ is a reset signal of latch $LA_1$. The high level signal at a line $l_{23}$ is a set signal of latch $LA_2$, and the high level signal at the line $l_{22}$ is a reset signal of latch $LA_2$.

When the battery power supply $V_{SS}$ is connected, the respective flip-flops $FF_1$ to $FF_{16}$ of the frequency divider 5 are respectively reset by the high level signal which is supplied through the line $l_{12}$ from the time adjusting circuit 13.

The latch circuit $LA_1$ is set by the high level signal, as indicated by a wave form B in FIG. 3, which is supplied through the line $l_9$ from the flip-flop FF 5.

The latch circuit $LA_2$ is reset by the high level signal, as indicated by a wave form F in FIG. 3, which is supplied through the line $l_{22}$ from the oscillation detector 10. As a result, the signal, which is fed out of the latch circuit $LA_2$ to a line $l_{24}$, assumes the low level at the time $t_0$, as indicated by a wave form H in FIG. 3.

When the signal at the line $l_{22}$ is made to assume the low level in response to the oscillation detection by the oscillation detector 10 at the time $t_3$, as indicated at the wave form F in FIG. 3, the latch circuit $LA_2$ is released from its reset state. As a result that the set signal is not supplied to the line $l_{23}$ at the time $t_3$, the signal at the line $l_{24}$ is held at the low level, as indicated by the wave form H in FIG. 3.

At a time $t_5$ one second after the frequency divider 5 has started its frequency dividing operation, the non-inverting output of the flip-flop FF 16 at that frequency divider 5 is changed from the low level to the high level, as indicated by the wave form C in FIG. 3. The latch circuit $LA_1$ is correspondingly reset.

The NAND circuit $ND_1$ has its two input terminals receiving signals as are simultaneously made to have the high level only for the delay time period of the NOR circuit $NR_2$ of the latch circuit $LA_1$.

The result is that the high level signal indicated by a wave form G in FIG. 3 is fed at a time $t_5$ to the line $l_{23}$ out of the inverter $IV_8$ which is made receptive of the output of the NAND circuit $ND_1$.

The latch circuit $LA_2$ is set by the high level signal at the line $l_{23}$ so that the high level signal as indicated by the wave form H in FIG. 3 is fed out to the line $l_{24}$.

The low level signal at the line $l_{24}$ is a starting state indicating signal.

The clock pulses $\phi_1'$ to $\phi_3'$ fed out of the NAND circuits $ND_5$ to $ND_7$, respectively, are simultaneously assume the high level in response to the starting state indicating signal.

The clock pulses $\phi_1'$ to $\phi_3'$ are supplied through the level shifting circuit 12 to the switching MISFETs $Q_1$ to $Q_4$ of the step down circuit 1.

When the steady operation is indicated by the fact that the signal at the line $l_{24}$ is made to have the high level, the clock pulses $\phi_1'$ to $\phi_3'$ are changed in the following manners.

Figure 5:
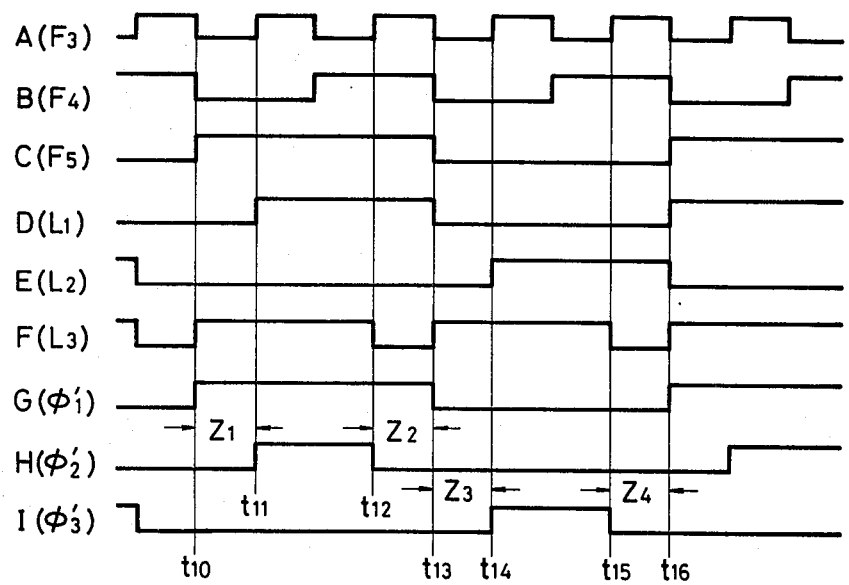
FIG. 5 is a chart illustrating the operating wave forms of the circuit of FIG. 4.

The output signal wave forms at the non-inverting output terminals of the flip-flops FF3 to FF5 of the frequency divider 5 are illustrated by letters A to C in FIG. 5.

The NAND circuit $ND_5$ generates, the clock signal in phase with the output signal of the flip-flop FF5, as indicated by a wave form G in FIG. 5.

The latch circuit $LA_3$ generates a signal, as is indicated by a wave form D in FIG. 5, in response to both the non-inverting output signal of the flip-flop FF3 and the inverted output signal of the flip-flop circuit FF5.

The NAND circuit $ND_2$ generates a signal as indicated by the wave form F in FIG. 5 upon reception of the non-inverting output signals of the flip-flop circuits FF3 and FF4.

The NAND circuit $ND_3$ is supplied with the output signals of the latch circuit $LA_3$ and the NAND circuit $ND_2$, and the NAND circuit $ND_6$ is supplied with the output signal of the NAND circuit $ND_3$ so that a clock signal $\phi_2'$ as is indicated by a wave form H in FIG. 5 is fed out of the NAND circuit $ND_6$.

Likewise, the latch circuit $LA_4$ generates a signal as is indicated by a wave form E in FIG. 5 upon reception of the non-inverting output signals of the flip-flop circuits FF3 and FF5.

The NAND circuit generates such a clock signal $\phi_3'$ as is indicated by a wave form I in FIG. 5 in response to the output signals of the latch circuit $LA_4$ and the NAND circuit $ND_2$.

The switching MISFET $Q_3$ of the step down circuit 1 of FIG. 1 is rendered conductive by the clock signal $\phi'$, during the time period of $t_{10}$ to $t_{13}$ of the period $t_{10}$ to $t_{16}$ of the clock signal.

The switching MISFET $Q_1$ is rendered conductive from the time after the time period $Z_1$ has elapsed from the time $t_{10}$ and is rendered non-conductive at the time $t_{12}$ which is earlier than the time $t_{13}$ by the time period $Z_2$.

The switching MISFET $Q_4$ is rendered conductive for the time period from the time $t_{13}$ to the time $t_{16}$.

The switching MISFET $Q_2$ is rendered conductive from the time after the time period $Z_3$ has elapsed from the time $t_{13}$ and is rendered non-conductive at the time $t_{15}$ which is earlier than the time $t_{16}$ by the time period $Z_4$.

According to the invention as described, the undesired rise in the output voltage of the step down circuit 1 can be prevented.

As is well known in the art, the capacitance of a battery is determined by the product of the discharging current (or output current) of the battery and the time period. For the identical capacitance, a battery having a larger electromotive force will have a larger storage energy. The electromotive force of the silver oxide battery is about 1.5 V, whereas the lithium battery has an electromotive force of about 3 V. Therefore, the lithium battery has a storage energy per unit volume about twice as large as that of the silver oxide battery.

If the step down circuit 1 is removed from the invention as described, the voltage regulator 2 is directly supplied with the voltage of the battery power supply $V_{SS}$. In this case, by the use of the voltage regulator 2, currents based upon both the through current and the charging and discharging currents to and from the capacitors as are to be consumed by the respective circuits which receive the output voltage of that voltage regulator 2 can be reduced. In the same case, however, a current substantially equal to that made to flow through the voltage regulator 2 will flow through the battery power supply so that the characteristic of the lithium battery having a high storage energy cannot be sufficiently utilized.

According to the present invention thus far described, by the provision of the step down circuit 1 and the voltage regulator 2, the current supplied from the lithium battery can be reduced to 1/2 if the current flowing from the voltage regulator 2 to the electronic circuit is indicated at I. Moreover, the voltage to be impressed upon the voltage regulator 2 can be dropped to one half of the battery voltage $V_{SS}$. As a result, the power loss at the voltage regulator 2 can be reduced. If respective electronic circuits are operated under a low voltage in the vicinity of the operatingg lower limit voltage by the voltage regulator 2, the power consumption of the respective electronic circuits can be reduced.

According to the invention thus far described, more the characteristic of the lithium battery having a high storage energy can be sufficiently utilized.

In other words, it is possible to provide an electronic watch which can remarkably elongate the life time of its battery power supply more than that the case when the silver oxide battery or the like is used as its power supply.

According to the invention as described, since the predetermined switching MISFETs of the step down circuit 1 are simultaneously rendered conductive at the starting state, as has been described hereinbefore, any special switching MISFET can be dispensed with.

Moreover, the step down circuit 1 does not contain none a circuit element, such as an inductor having a relatively large-sized and complex construction. Therefore, the step down circuit 1 finds suitable application in an electronic wrist watch which is required to be small-sized.

Figure 10:
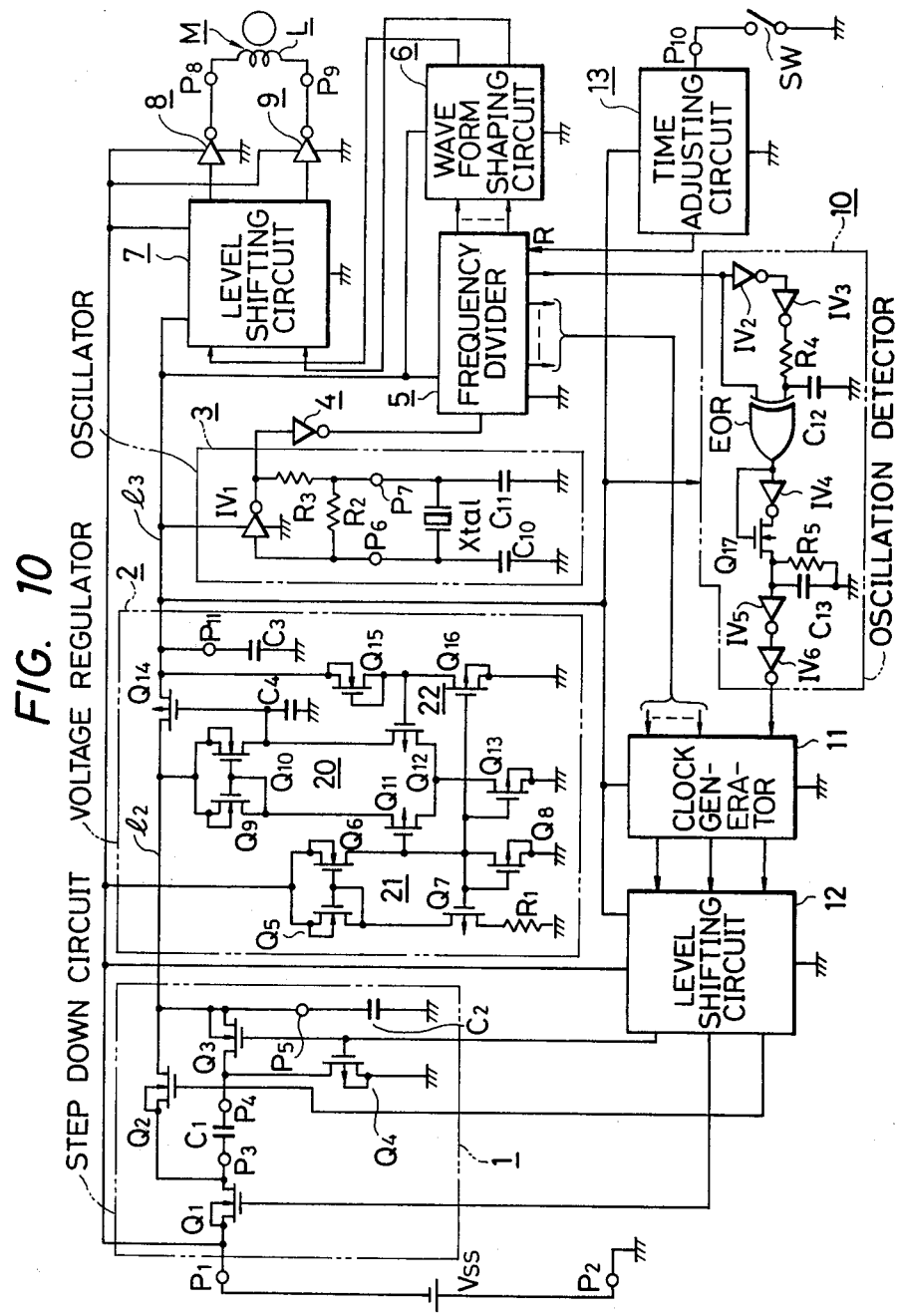
FIG. 10 is a circuit diagram showing another embodiment of the present invention.

Turning now to FIG. 10, there is shown another embodiment of the present invention.

In this second embodiment of the invention, a capacitor $C_3$ having a relatively large capacitance is connected, as illustrated, with the output terminal of the voltage regulator 2 through an external terminal $P_{11}$. Incidentally, the other circuits appearing in FIG. 10 are made to have the same construction as those of the first embodiment illustrated in FIG. 1.

The capacitor $C_3$ used in the second embodiment is provided for the following reasons.

In the voltage regulator of FIG. 10, the control MISFET $Q_{14}$ has a relatively small current flow therethrough so that it has a relatively high impedance. On the other hand, the signals to be generated at the respective nodes of the level shifting circuit 22 and the differential amplifier 20 used in the voltage regulator 2 are charged at relatively low rates partly because those circuits 22 and 20 are operated by small currents, respectively, and partly because parasitic capacitances exist at or coupled to the respective circuit nodes.

Consumption current as is determined by the aforementioned through current and by the charging and discharging currents to and from the capacitance is made to flow through the frequency divider 5, the wave form shaping circuit 6 and so on. The current to be consumed by the circuits 5 and 6 etc. is relatively rapidly changed in a periodical manner in accordance with the operating states of the circuits 5 and 6 etc.

As has been described above, the voltage regulator 2 has a relatively low operating rate and a relatively high output impedance so that the voltage at the line $l_3$ is relatively highly changed in accordance with the operating states of the circuits 5 and 6 etc. The fluctuations in the voltage at the line $l_3$ cause the undesired interference among the respective circuits which are coupled to that line $l_3$.

If the capacitor $C_3$ is provided in the second embodiment being described, the impedance at the line $l_3$ can be sufficiently reduced so that the undesired interference can be prevented.

Figure 11:
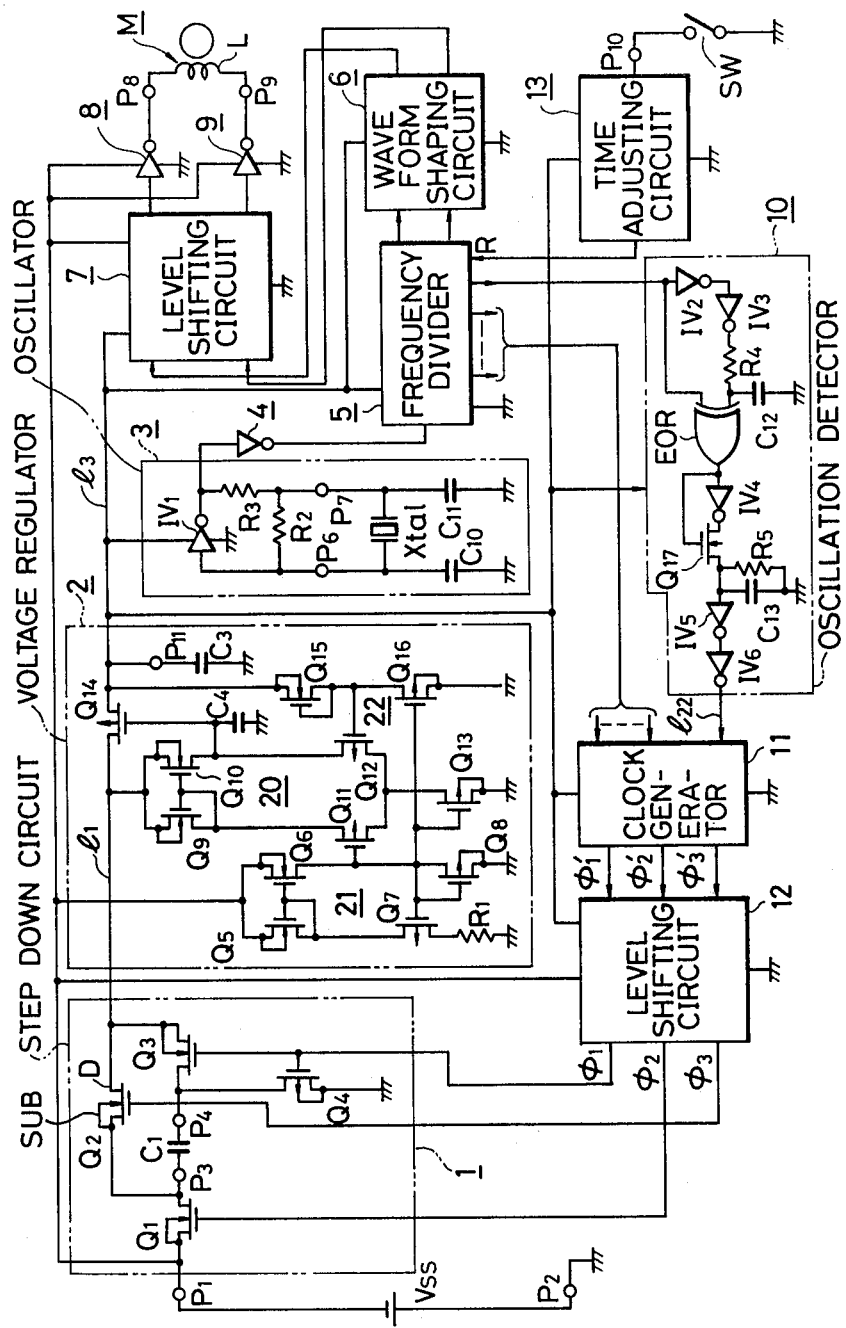
FIG. 11 is a circuit diagram showing still another embodiment of the present invention.

Turning to FIG. 11, there is shown another embodiment of the stabilized power supply circuit which can reduce the output impedance without increasing the external terminals and capacitors of the IC. In this third embodiment, the circuit construction other than the step down circuit 1 and the voltage regulator 2 is made identical to the foregoing embodiment of FIG. 1 or FIG. 10. Therefore, the explanations of the circuits other than the circuits 1 and 2 will be omitted from the following.

In the third embodiment, the step down circuit 1 and the voltage regulator 2 are integrated, as will be apparent from the following description. Specifically, the capacitor $C_3$, which corresponds to the capacitor $C_2$ connected with the ground potential of the step down circuit 2, is connected with the output terminal of the control MISFET $Q_{14}$, of the voltage regulator 2, through the external terminal $P_{11}$, as shown in FIG. 11. In other words, the circuit of this third embodiment is equivalent to that which is constructed by eliminating the capacitor $C_2$ and the terminal $P_5$ from the circuit of the second embodiment of FIG. 10.

Figures 12A, 12B:
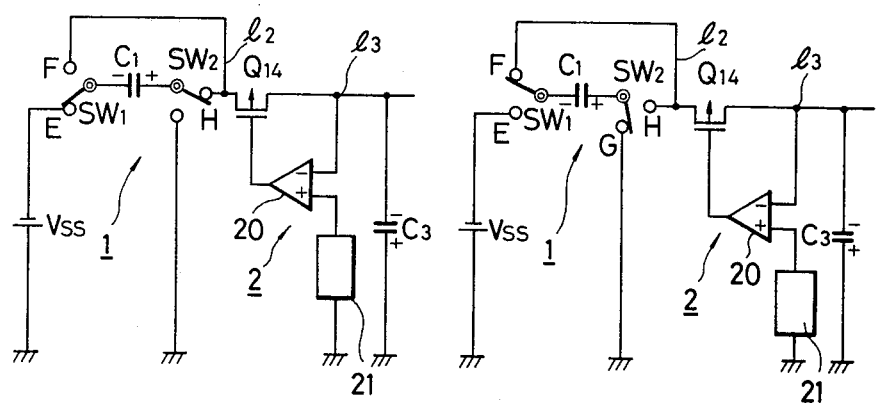
FIGS. 12A and 12B are diagrams showing the operating principle of the circuit of FIG. 11.

The operation of the circuit of the third embodiment will now be described in detail with reference to the diagrams of FIGS. 12A and 12B illustrating the operating principle thereof.

FIG. 12A illustrates the state, at which the MISFET $Q_1$ and $Q_3$ shown in FIG. 11 are rendered conductive. Specifically, switches $SW_1$ and $SW_2$ are connected with their E and H contacts, respectively. The capacitors $C_1$ and $C_3$ are connected in series through the control MISFET $Q_{14}$ so that they are charged by the battery power supply $V_{SS}$. In this charging operation, the control MISFET $Q_{14}$ is rendered substantially non-conductive by the output of the differential amplifier 20 when the charging voltage of the capacitor $C_3$ reaches the reference voltage. As a result, the capacitors $C_1$ and $C_3$ are charged with substantially equal charges.

On the other hand, FIG. 12B illustrates the state, at which the MISFETs $Q_2$ and $Q_4$ shown in FIG. 11 are rendered conductive. Specifically, the switches $SW_1$ and $SW_2$ are connected with their F and G contacts, respectively, so that the capacitor $C_1$ is disconnected from the battery power supply $V_{SS}$. At this particular state, the capacitors $C_1$ and $C_3$ are connected in an identical polarity substantially in parallel with each other through the MISFET $Q_{14}$. In this parallel connection, the capacitor $C_1$ is connected in parallel with the capacitor $C_3$ through the MISFET $Q_{14}$ so that the charging voltage of the capacitor $C_3$ is maintained at a constant voltage irrespective of the current consumption to the electronic circuit.

In the third embodiment, since the capacitor $C_3$ is connected with the output terminal of the voltage regulator 2, the output impedance of the power supply circuit can be sufficiently reduced, and the fluctuations in the constant output voltage can be reduced to a low level similarly to the circuit of the embodiment shown in FIG. 10. In the third embodiment, moreover, since only the two external capacitors are sufficient for the IC, the circuit of the third embodiment can be made remarkably useful especially in case it is applied to a device having an actual limited mounting space, e.g., a thin type electronic wrist watch.

In the circuit of FIG. 11, incidentally, it is preferred by the following reason that the capacitor $C_1$ be made to have a smaller capacitance than the capacitor $C_3$.

In the circuit shown in FIG. 11, specifically, the timing pulses $\phi_1$ to $\phi_3$ are made to have the high level similarly to the circuits shown in FIGS. 1 and 10 by the high level of the oscillatory detecting signal, which is supplied at the start to the line $l_{22}$, so that the MISFETs $Q_1$, $Q_2$ and $Q_3$ are simultaneously rendered conductive by the timing pulses $\phi_1$ to $\phi_3$ at that high level whereas the MISFET $Q_4$ is rendered non-conductive. As a result, the battery voltage $V_{SS}$ is impressed directly upon the voltage regulator 2 so that the capacitor $C_3$ is charged at a predetermined constant voltage. At this time, the capacitor $C_1$ is not charged because the MISFET $Q_2$ is rendered non-conductive, as has been described in the above. As a result that the capacitor $C_1$ is not charged during the starting operation as described above, the circuit performs the following undesired operation only during a predetermined time period after the start has been ended. By the wave forms A to E in FIG. 13, incidentally, there are illustrated the signal at the line $l_{24}$ (which is shown in FIG. 4) in the clock generator when the battery power supply is made at the time $t_0$ and when the starting state is ended at the time $t_5$, the clock pulses $\phi_1$ to $\phi_3$, and the output voltage of the voltage regulator 2.

Figure 13:
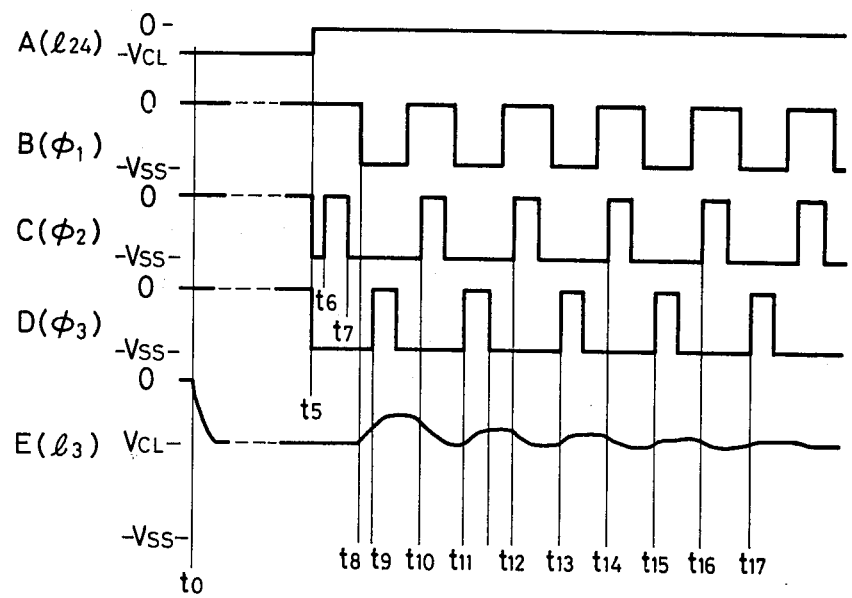
FIG. 13 is a chart illustrating the operating wave forms of the circuit of FIG. 11.

First of all, by raising the signal at the line $l_{24}$ to the high level at the time $t_5$, the clock pulses $\phi_2$ and $\phi_3$ of the clock pulses $\phi_1$ to $\phi_3$ are made to have the low level, as indicated by the wave forms C and D in FIG. 13. As a result, the switching MISFETs $Q_1$, $Q_2$ and $Q_4$ are rendered non-conductive, whereas the switching MISFET $Q_3$ is rendered conductive.

Next, when the clock pulse $\phi_2$ is made to have the high level at a time $t_6$, as indicated by the wave form C in FIG. 13, the line $l_2$ is supplied with the voltage of the battery power supply $V_{SS}$ through the MISFET $Q_1$, the capacitor $C_1$ and the MISFET $Q_3$. In this case, since the capacitor $C_3$ is charged in advance during the starting operation, no more than a relatively small charging current flows through the capacitor $C_1$. Therefore, the inter-terminal voltage of the capacitor $C_1$ can be deemed to be substantially at a zero level.

As a result of the clock pulse $\phi_2$ being made to have the low level at a time $t_7$, the MISFET $Q_1$ is rendered non-conductive.

If the MISFET $Q_4$ is rendered conductive as a result that the clock pulse $\phi_1$ is made to have the low level at a time $t_8$, the source of the MISFET $Q_2$ is dropped substantially to the ground potential through the MISFET $Q_4$ and the capacitor $C_1$. At this time, the MISFET $Q_2$ has its drain D supplied with the output voltage of the capacitor $C_3$ through the control MISFET $Q_{14}$ and the line $l_2$ so that the pn junction (i.e., the drain junction) between its drain D and a substrate gate SUB is biased in the forward direction. As a result, the charges stored in the capacitor $C_3$ are distributed to the capacitor $C_1$ through the drain junction between the control MISFET $Q_{14}$ and the switching MISFET $Q_2$. In other words, the voltage supplied to the line $l_3$ starts to have even its value dropped, as indicated by the wave form E in FIG. 13.

If the clock pulse $\phi_3$ has the high level at a time $t_9$, the MISFET $Q_2$ is rendered conductive as a result of the p-type region (although not shown) below its gate electrode being formed on its surface with a channel region. As a result, the charging voltage of the capacitor $C_3$, i.e., the voltage at the line $l_3$ is further dropped, as indicated by the wave form E in FIG. 13.

If clock pulse $\phi_2$ has the high level at the time $t_{10}$, the line $l_2$ is supplied with the voltage of the battery power supply $V_{SS}$ (similarly to the circuit operation at the time $t_6$) through the MISFET $Q_1$, the capacitor $C_1$ charged by the charge distribution, and the MISFET $Q_3$ so that the charging voltage of the capacitor $C_3$ is raised again, as indicated by the wave form E in FIG. 13, to the level which is determined by the characteristic of the voltage regulator 2.

The fluctuations in the charging voltage of the capacitor $C_3$ are reduced, as indicated by the wave form E in FIG. 13, by repeating the switching operations of the MISFET $Q_1$ to $Q_4$ because the charges of the capacitor $C_1$ are gradually increased.

When the voltage at the line $l_3$ is dropped, as has been described above, the oscillator 3 interrupts its operation for the aforementioned reason. If the voltage drop at the line $l_3$ is substantial, there arises a problem that the step down circuit cannot be brought again into its starting state.

In the third embodiment of FIG. 11, as has been described hereinbefore, the capacitor $C_1$ is made to not have a capacitance equal to that of the capacitor $C_3$ but to have a smaller capacitance than that of the capacitor $C_3$. As a result, the charges to be distributed from the capacitor $C_3$ to the capacitor $C_1$ immediately after the start has been ended can be reduced so that the voltage drop of the capacitor $C_3$ can be reduced.

If the capacitance of the capacitor $C_1$ is made smaller than that of the capacitor $C_3$, as has been described above, there arises the following advantage. Specifically, in the normal operation after the charge distribution from the capacitor $C_3$ to the capacitor $C_1$ has been ceased, the capacitor is made to have a relatively large charging voltage as a result of its capacitance being small. If the charging voltage of the capacitor $C_1$ is made to have the large value, it can be distributed at a relatively high rate to the capacitor $C_3$ when the MISFETs $Q_2$ and $Q_4$ are rendered conductive. As a result, of the voltage of the capacitor $C_3$ is dropped, it can be made to be restored to a desired value at a relatively high rate. Incidentally, the capacitor $C_3$ is desired to be charged to the stabilized output voltage $V_{CL}$ when it is connected in series with the capacitor $C_1$. It is, therefore, desired that the capacitance ratio between the capacitors $C_1$ and $C_2$ be restricted to such a value as corresponds to the ratio between the desired voltage $V_{CL}$ and the battery voltage $V_{SS}$.

In order to prevent those fluctuations in the output voltage $V_{CL}$ which result from the fact that the capacitor $C_1$ is not charged in advance, it is desirable for the capacitor $C_1$ to be charged at the starting state. For this purpose, the internal construction of the clock generator 11 may be suitably modified such that the clock pulse $\phi_1$ is made to have the high level when the clock pulses $\phi_2$ and $\phi_3$ are made to have the high level at the starting state. However, even if the capacitor $C_1$ is thus charged in advance, it is difficult by the following reason to eliminate the fluctuations in the charging voltage of the capacitor $C_3$ after the starting state has been ended.

If the above modification is made to cause the clock pulse $\phi_1$ to have a high level at the starting state, more specifically, the capacitor $C_1$ is resultantly charged at the starting state substantially to the voltage of the battery power supply $V_{SS}$. Thus, if the MISFETs $Q_1$ and $Q_3$ are rendered conductive after the starting state has been ended, a line $l_1$ is supplied with the voltage at such a level, i.e., at a zero level as is determined by subtracting the charging voltage of the capacitor $C_1$ from the output voltage of the battery power supply $V_{SS}$. As a result, the voltage of the capacitor $C_3$, i.e., the voltage at the line $l_3$ is fluctuated.

Figure 14:
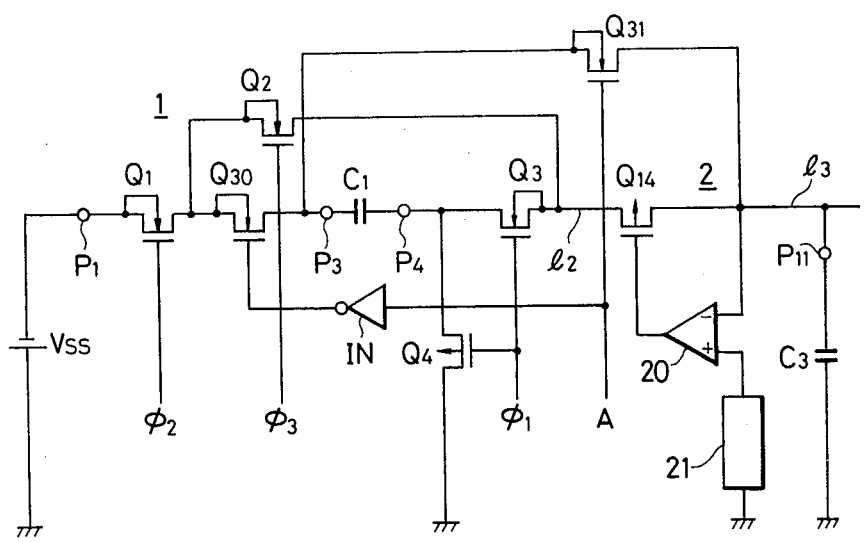
FIG. 14 is a circuit diagram showing a further embodiment of the present invention.

FIG. 14 shows a circuit according to a fourth embodiment of the present invention.

In this fourth embodiment, it is considered that the impedance at the output terminal of the voltage regulator 2 is sufficiently reduced by the capacitor $C_3$ which is attached to the IC through the external terminal $P_{11}$ and that the two capacitors attached to the IC may be identical to each other.

As a result, the assembling workers of the electronic watch can be released from the trouble that the capacitors $C_1$ and $C_3$ have to be connected to the respective external terminals of the IC after they have been differentiated.

In the fourth embodiment, as illustrated, a MISFET $Q_{30}$ is connected between the common node between the switching MISFETs $Q_1$ and $Q_2$ and the terminal $P_3$, and a MISFET $Q_{31}$ is connected between the external terminal $Q_3$ and the line $l_3$.

Figure 15:
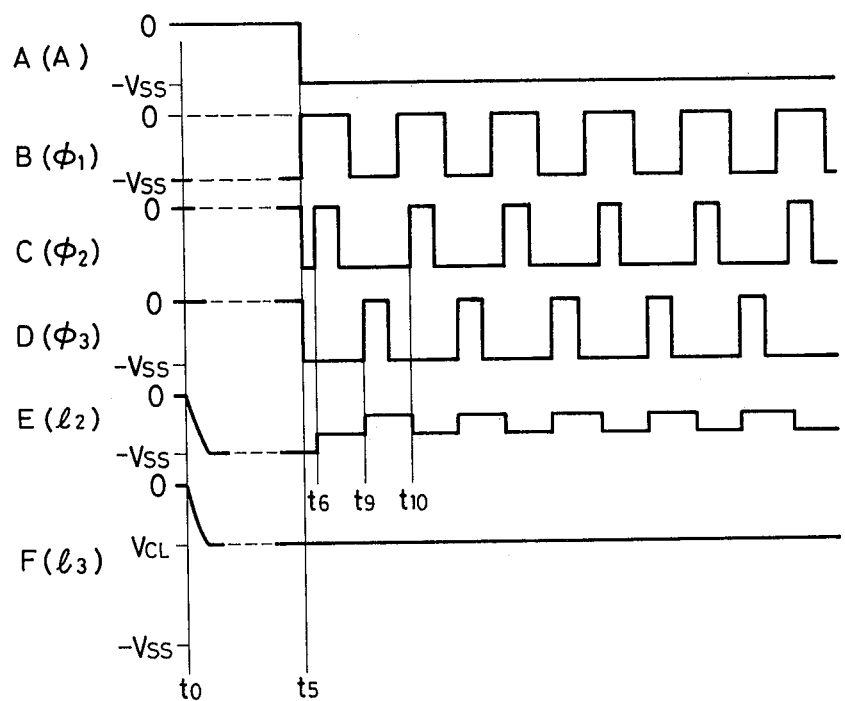
FIG. 15 is a chart illustrating the operating wave forms of the circuit of FIG. 14.

The MISFET $Q_{31}$ has its gate supplied, as indicated by a wave form A in FIG. 15, with a start control signal A which is made to have a level amplitude of $-V_{SS}$ and which is made to have the low level (i.e., $-V_{SS}$) when the starting state of the power supply is ended. The start control signal A can be produced, for example, by applying the signal, which is supplied to the line $l_{24}$ of the circuit of FIG. 4, to a level shifting circuit as is illustrated in FIG. 6.

The MISFET $Q_{30}$ has its gate supplied with the start control signal A through an inverter IN which is operated directly by the battery power supply $V_{SS}$.

Signals, which are made to have their levels shifted to the $V_{SS}$ level and to have opposite phases to each other so that they may be supplied to the gates of the MISFETs $Q_{30}$ and $Q_{31}$, may be generated from the drains of the MISFETs $Q_{20}$ and $Q_{22}$ of the level shifting circuit of FIG. 6. If this modification is made, the inverter IN can be eliminated.

In the fourth embodiment, the clock pulse $\phi_1$ at the starting state is made to have the low level, whereas the clock pulses $\phi_2$ and $\phi_3$ are made to have the high level.

In order to attain the clock pulse $\phi_1$, the NAND circuit ND$_5$ of FIG. 4 is replaced by a NOR circuit, which is supplied with both the inverted output signal of the flip-flop circuit FF5 and a signal produced by inverting the signal at the line $l_{24}$ by means of an inverter.

The operation of the fourth embodiment will be described in the following.

First of all, as indicated at the wave form A in FIG. 15, as a result of the start control signal A being at the high level during the starting time period from the time $t_0$ to the time $T_5$, the MISFET Q$_{31}$ is rendered conductive and the MISFET Q$_{30}$ is rendered non-conductive.

During the starting time period as a result of the timing pulse $\phi_1$ having the low level and the timing pulses $\phi_2$ and $\phi_3$ having the high level, as has been described hereinbefore, the switching MISFETs Q$_1$, Q$_2$ and Q$_4$ are rendered conductive, and the switching MISFET Q$_3$ is rendered non-conductive.

As a result, the line $l_2$ is supplied with the voltage of the battery power supply V$_{SS}$ through the switching MISFET Q$_1$ and Q$_2$ which are conductive. For the reasons that the MISFETs Q$_{31}$ and Q$_4$ are conductive at that time, the capacitor C$_1$ is connected in parallel with the capacitor C$_3$ through MISFETs Q$_{31}$ and Q$_4$. As a result of the MISFET Q$_{30}$ is non-conductive, a direct current path being not established between the capacitor C$_1$ and the battery power supply V$_{SS}$.

As a result, both the capacitors C$_1$ and C$_3$ are charged to the voltage which is determined by the voltage regulator 2.

As a result of the start control signal A being made to have the low level at the time $t_5$, the starting state is ended. After this end, the MISFET Q$_{30}$ is rendered conductive whereas the MISFET Q$_{31}$ is rendered non-conductive.

As has been described above, the capacitor C$_1$ is charged to the voltage V$_{CL}$ at the starting state. After the starting state has been ended, the charge distribution from the capacitor C$_3$ to the capacitor C$_1$ does not take place so that the voltage of the capacitor C$_3$, i.e., the voltage at the line $l_3$ can be made constant, as indicated by a wave form F in FIG. 15, notwithstanding whether it is at the starting state or not.

The voltage at the line $l_2$, which is connected with the drain of the control MISFET Q$_{14}$ of the voltage regulator 2, is changed during the normal operation after the starting state has been ended, as is indicated by a wave form E in FIG. 15.

Specifically, the voltage at the line $l_2$ is made to have the value, which is determined by subtracting the charging voltage of the capacitor C$_1$ from the voltage of the battery power supply V$_{SS}$, which causes the switching MISFETs Q$_1$ and Q$_3$ be rendered conductive at the time $t_6$. The charging operations of the capacitors C$_1$ and C$_3$ are substantially stopped when the voltage at the line $l_3$, i.e., in the capacitor C$_3$ is made to have the level which is determined by the voltage regulator 2. The charging voltage of the capacitor C$_1$ is accordingly reduced to a relatively small value so that the voltage at the line $l_2$ is made to have a relatively large value.

On the contrary, as a result of the switching MISFETs Q$_4$ and Q$_2$ being rendered conductive at the time $t_9$, the charging voltage of the capacitor C$_1$ is supplied to the line $l_2$. As a result, the voltage at the line $l_2$ is dropped to a relatively small value, as illustrated.

Figure 16:
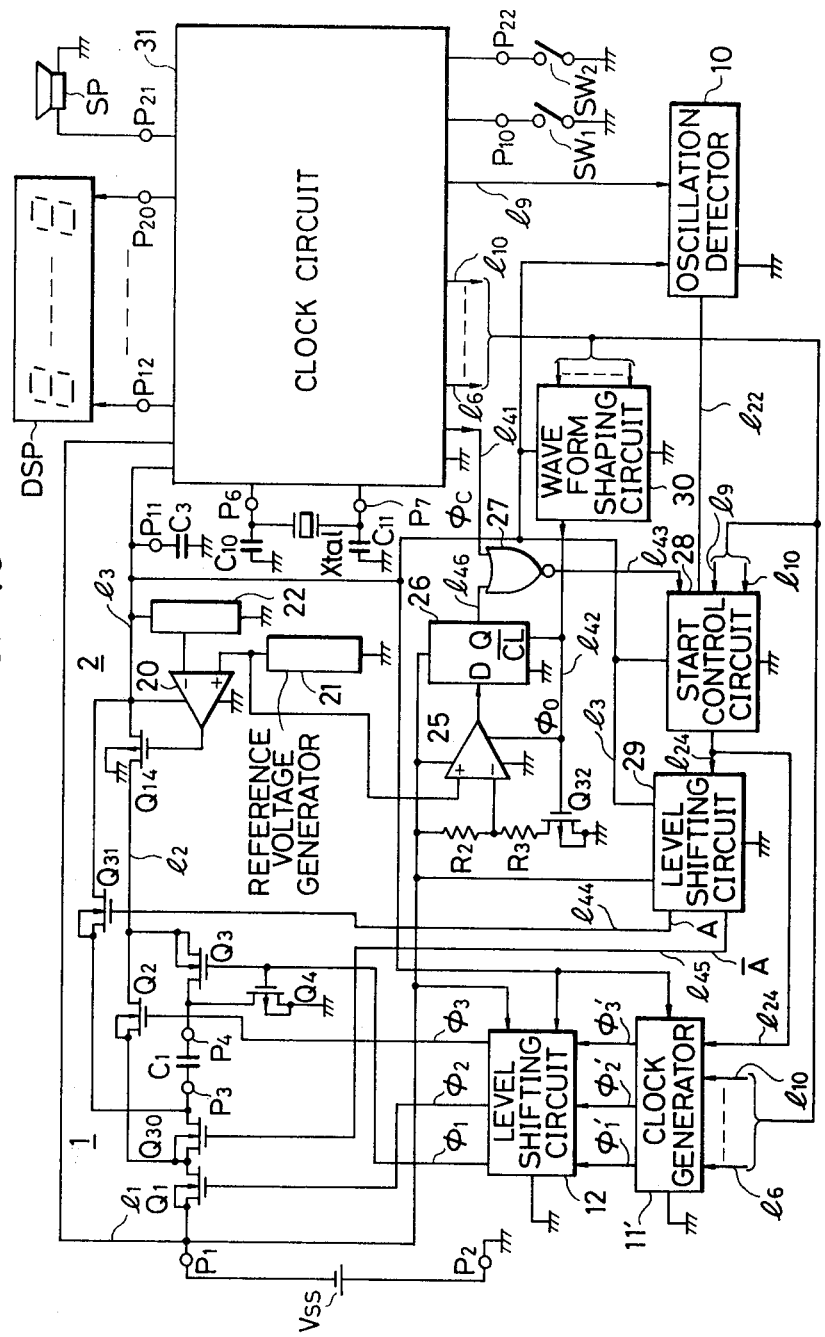
FIG. 16 is a circuit diagram showing a further embodiment of the present invention.

FIG. 16 illustrated a circuit according to a fifth embodiment of the present invention.

In order to elongate the lifetime of the battery, according to the fifth embodiment, a stabilized output voltage having a sufficient value to operate a watch can be generated by the voltage regulator 2 even if the voltage of the battery power supply V$_{SS}$ is dropped to a relatively low level.

In the fifth embodiment, although the step down circuit 1 and the voltage regulator 2 are integrated with each other, they are assumed to be made separate for the sake of convenience in the following description. The voltage to be supplied from the step down circuit 1 to the line $l_2$ is made to have about one half of the voltage of the battery power supply V$_{SS}$. Consequently, the the relationship between the voltage of the battery power supply V$_{SS}$ and the voltage at the line $l_2$ is illustrated by the characteristic curve $l_2$ in the graphical presentation of FIG. 17.

Since the voltage regulator 2 is made responsive to the output voltage of the step down circuit 1, it generates the stabilized voltage V$_{CL}$ if the output voltage of the step down circuit 1 is substantially equal to or higher than the stabilized voltage V$_{CL}$.

If the voltage regulator 2 is supplied exclusively with the step down voltage which is generated by the step down circuit 1, the step down voltage is dropped to a lower level than the stabilized voltage V$_{CL}$ by the slight reduction in the voltage of the battery power supply V$_{SS}$, and the output voltage of the voltage regulator 2 is accordingly dropped. More specifically, the output voltage of the voltage regulator 2 is dropped from the point D in FIG. 17 along the characteristic curve $l_2$. As a result, notwithstanding that a relatively high voltage is being generated by the battery power supply V$_{SS}$, it becomes necessary to replace the battery power supply.

In order to elongate the lifetime of the battery, according to the fifth embodiment, the voltage of the battery power supply V$_{SS}$ is supplied directly to the voltage regulator 2 when the battery voltage is made to have such a level as to drop the step down voltage substantially to the stabilized voltage V$_{CL}$. Then, the output voltage of the voltage regulator 2 is stabilized until the voltage of the battery power supply V$_{SS}$ is dropped to a level indicated at a point C in FIG. 17, namely, until the voltage of the battery power supply V$_{SS}$ is dropped to a level V$_{SS}''$ which is substantially equal to the stabilized voltage V$_{CL}$.

The construction of the fifth embodiment will now be described in detail.

The step down circuit 1 is made, as illustrated, to have a construction similar to that of the circuit of FIG. 14. At the starting state, the clock pulse $\phi_1$ is made to have the low level, whereas the clock pulses $\phi_2$ and $\phi_3$ are made to have high level. The switching MISFETs Q$_1$, Q$_2$ and Q$_4$ are accordingly rendered conductive, whereas the switching MISFET Q$_3$ is rendered non-conductive. On the the MISFET Q$_{30}$ is rendered non-conductive in response to such a control signal $\overline{A}$ at the low level as is supplied from a level shifting circuit 29, and the MISFET Q$_{31}$ is rendered conductive by the control signal A at the high level.

The voltage regulator 2 is constructed similarly to the control MISFET Q$_{14}$, the differential amplifier 20, the reference voltage generator 21 and the level shifting circuit 22.

A clock circuit 31 is formed with a plurality of power supply wirings in accordance with the concept of the present invention and is additionally formed with a level shifting circuit, if necessary. The clock circuit 31 is basically constructed of a variety of known circuits. Although not especially, limited thereto the clock circuit 31 is constructed, for example, of: an oscillator for generating a reference frequency signal; a frequency divider responsive to of the reference frequency signal from the oscillator to generate a second clock signal; a variety of time counters made responsive to the output signal of the frequency divider to generate time data e.g. ten seconds, one minute, ten minutes, one hour, ten hours, one day or ten days; a display decoder for converting the output signals of the various time counters into display signals; an output buffer circuit made responsive to the output signal of the display decoder; a stop watch circuit; an alarm circuit; a mode selector made detective of the operation order of the switches $SW_1$ and $SW_2$, which are connected between the external terminals $P_{10}$ and $P_{22}$ and the grounded point of the circuit, to select a variety of modes of the watch such as a normal watch operation mode, a time correcting mode, a stop watch mode or an alarm mode; a control circuit for controlling the operations of the various circuits in accordance with the combinations of the output signal of the mode selector and the signal from the switch $SW_1$ or $SW_2$; and an output buffer circuit made responsive to the output signal of the alarm circuit (although all of the circuits are not shown).

The watch circuit 31 may also be constructed of well-known ROM-RAM type circuit which includes: an oscillator; a timing pulse generator; a random access memory for writing time data, operation mode data, stop watch data or alarm data; a read only memory (or ROM) for writing microinstruction; a program counter; an arithmetic logical unit; and a variety of decoders.

For the watch circuit 31 as described, there are generated: a display decode signal for driving a display DSP having liquid crystal segments, which are arranged in the form of a squarish numeral "8" for each figure, as illustrated; a signal for driving acoustic converting means SP which is provided to generate an alarm sound and which is constructed of a piezoelectric element or the like; and a variety of clock and control signals to be supplied to a variety of such circuits as will be described in the following.

The output buffer circuit, which is disposed in the clock circuit 31 to drive the acoustic converting means SP, requires such a relatively large drive current that it is operated by the direct voltage of the battery power supply $V_{SS}$.

In the fifth embodiment order to detect the voltage of the battery power supply $V_{SS}$, a comparator 25 is provided, as illustrated.

The comparator 25 has its non-inverting input terminal supplied with the reference voltage, which is generated by the reference voltage generator 21, and its inverting input terminal supplied with the voltage of the battery power supply $V_{SS}$ through a voltage divider which is constructed of the resistors $R_2$ and $R_3$.

Figure 17:
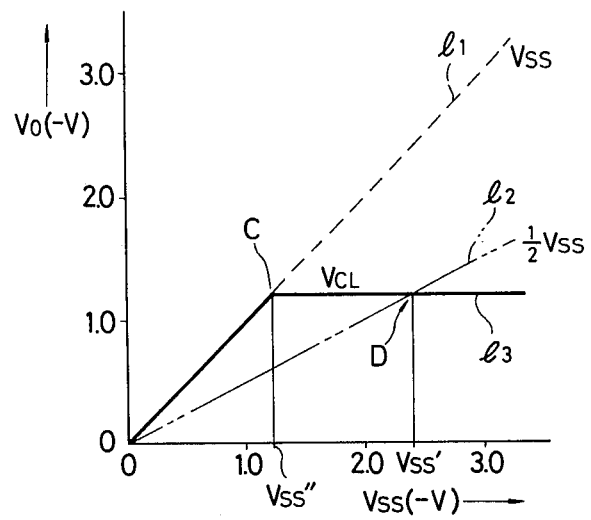
FIG. 17 is a graph illustrating the characteristic curve of the circuit of FIG. 16.

The divided voltage fed out of the voltage divider ($R_2$ and $R_3$) is made equal to the output voltage of the reference voltage circuit 21 by suitably setting the voltage dividing ratio of the resistors $R_2$ and $R_3$ when the voltage of the battery power supply $V_{SS}$ is dropped to a level to be detected (i.e., a detection level), i.e., to a level equal to or slightly larger than the value $V_{SS}'$ indicated in FIG. 17.

As a result, when the voltage of the battery power supply $V_{SS}$ is dropped to a level lower equal to or lower than the detection level, the output voltage of the comparator 25 is accordingly raised to the high level.

Although not especially limitative, in the fifth embodiment the voltage divider ($R_2$ and $R_3$) and the comparator 25 are intermittently operated so as to reduce their respective average currents being consumed. In order to intermittently operate the voltage divider ($R_2$ and $R_3$), as shown, there is provided a switching MISFET $Q_{32}$ which is rendered conductive by a clock pulse $\phi_0$. On the other hand, the comparator 25 is supplied with the same clock pulse as the clock pulse $\phi_0$ to be supplied to the switching MISFET $Q_{32}$.

Incidentally, the comparator 25 has a construction similar to that of the differential amplifier 20 illustrated in FIG. 1. For the sake of the intermittent operations, a MISFET similar to the constant current MISFET $Q_{13}$ of FIG. 1 has its gate supplied with the clock pulse $\phi_0$.

A latch circuit 26 is provided, as illustrated, so as to generate a series of signals on the basis of the intermittent output signals which are fed out of the comparator 25.

Since the comparator 25 is rendered operative by the clock pulse $\phi_0$, the latch circuit 26 has its data input terminal $\overline{CL}$ supplied with the same clock pulse as the clock pulse $\phi_0$ which is supplied to the comparator 25.

The clock pulse $\phi_0$ can be fed out of a wave form shaping circuit 30 which is response to reference clock signals having respective frequencies as are generated by the clock circuit 31, as illustrated. Incidentally, by generating the clock pulse $\phi_0$ from the circuit having the construction thus far described, the timing of the output signal of the latch circuit 26 and the timing of the clock pulse $\phi_1$ to $\phi_3$ can be synchronized.

The output signal of the latch circuit 26 is supplied through a NOR gate 27 to a start control circuit 28.

The gate circuit 27 is provided to correspond to the fact that the electronic watch is equipped with display means, an alarm circuit and an acoustic converting means SP which require a relatively large drive current, as has been described above.

The gate circuit 27 has its one input terminal supplied with a control signal $\phi_C$ through a line $l_{41}$ from the control circuit in the clock circuit 31 as is raised to the high level in synchronism with the timing at which the drive current flows through the display means and acoustic converting SP.

The battery power supply $V_{SS}$ usually has such a relatively large internal resistance that its output voltage is largely dropped internally if a large current flows. This reduction in the voltage of the battery power supply $V_{SS}$ is detected by the comparator 25. It should, however, be noted that a slight time delay occurs until the reduction of the voltage is detected.

Of the gate circuit 27 and the control signal $\phi_C$ are used, it becomes unnecessary to await the voltage drop detection output based upon the output signal of the comparator 25.

As will become apparent from the following description, according to the fifth embodiment, the voltage of the battery power supply $V_{SS}$ is supplied to the voltage regulator 2, before circuit operation is started as to drop the voltage of the battery power source $V_{SS}$, so that the undesired voltage drop at the line $l_3$ can be prevented.

In the drawing of this fifth embodiment, the start control circuit 28 is indicated independently of a clock generator 11' so as to facilitate its understanding.

Figure 18:
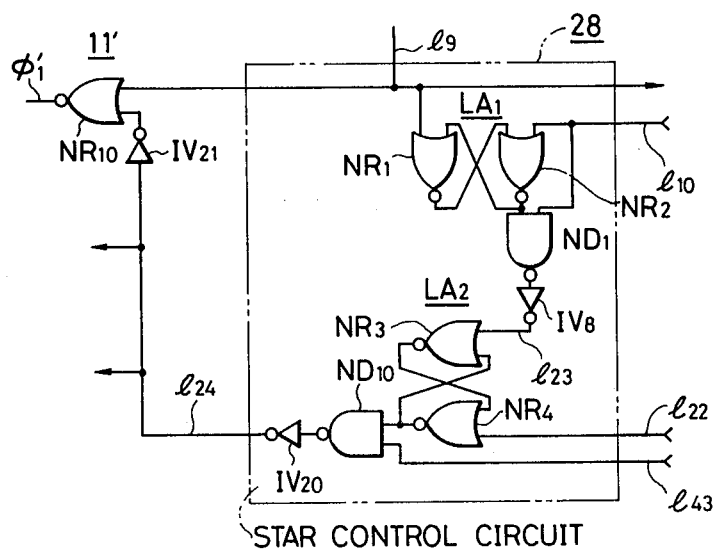
FIG. 18 is a logical circuit diagram showing a block 28 of FIG. 16.

The start control circuit 28 is illustrated in more detail in FIG. 18. As is apparent from FIG. 18, the start control circuit 28 is so constructed that a NAND circuit $ND_{10}$ and an inverter $IV_{20}$ are added to the start control circuit of FIG. 4.

The NAND circuit $ND_{10}$ has its one input terminal supplied with a signal through a line $l_{43}$ from the NOR gate circuit 27 (as illustrated in FIG. 16) which is dropped to the low level when the reduction in the battery power supply voltage is detected and when the alarm display is made. As a result, the start control circuit 28 feeds out the low level signal to the line $l_{23}$ not only during the start period but also when the output of the NOR gate 27 is made to have the low level.

A portion of the clock generator 11' is also illustrated in FIG. 18. The clock pulse $\phi_1'$, fed out of a shown NOR circuit $NR_{10}$, is dropped to the low level in a manner to correspond to the fact that the signal at the line $l_{24}$ is made to have the low level.

Figure 19:
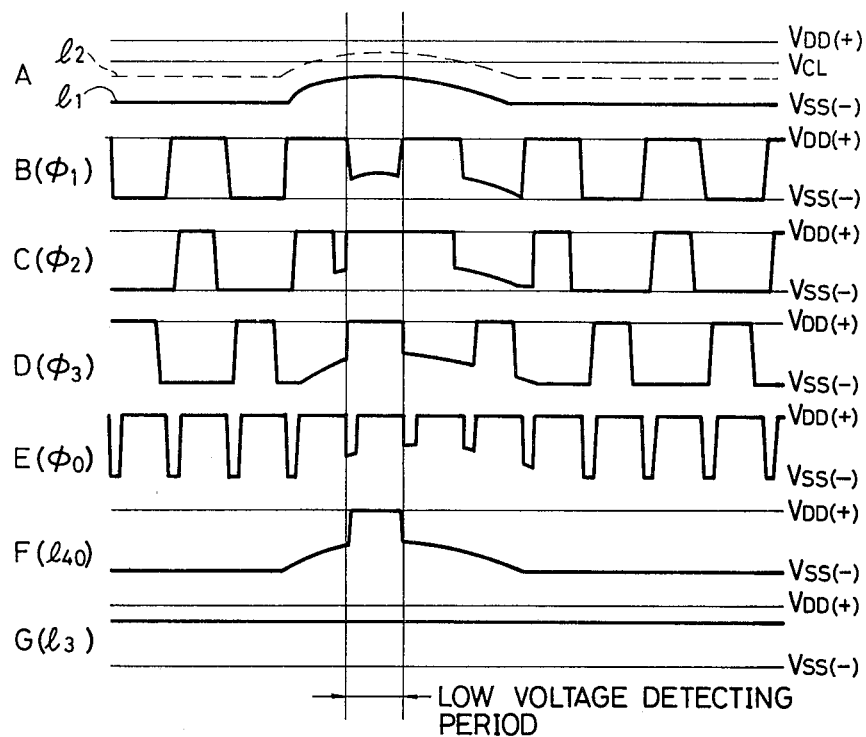
FIG. 19 is a chart illustrating the operating wave forms of the circuit of FIG. 16.

The operating wave forms of the circuit of FIG. 16 are indicated at letters A to G in FIG. 19. In FIG. 19, the letters $V_{DD}$ (+) imply the ground potential of the circuit, whereas incidentally letters $V_{SS}$ (−) imply the potential corresponding to the output potential of the battery power supply $V_{SS}$.

In accordance with the embodiment under description, even if the step down voltage becomes equal to or lower than the stabilized output voltage $V_{CL}$, the stabilized output voltage $V_{CL}$ at a predetermined level is generated by the switching operations so that the battery voltage $V_{SS}$ can be effectively used. As a result, the lifetime of the battery can be elongated. Above all, the lithium battery has such a high internal resistance, e.g., several hundreds ohms that a large voltage drop takes place in the operation mode of a large current consumption. The addition of such a function as has been described in this embodiemnt becomes especially suitable when the lithium battery is used.

Figure 20:
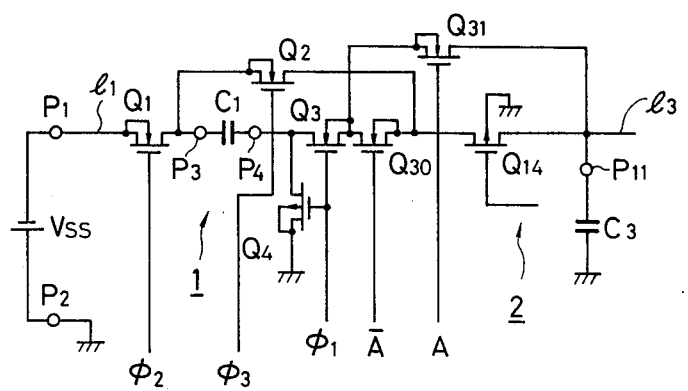
FIGS. 20 and 21 are circuit diagrams showing further embodiments of the present invention, respectively.

The present invention is not limited to the embodiments thus far described. For example, the circuits 1 and 2 of FIGS. 14 and 16 may be replaced by the circuit shown in FIG. 20. In FIG. 20, the elements corresponding to the respective elements of the foregoing embodiments are indicated by the identical reference characters.

In this circuit of FIG. 20, at the starting state and upon reduction in the battery power supply voltage, the block pulses $\phi_1$ to $\phi_3$ and the control signal A are made to have the high level, and the control signal $\bar{A}$ is made to have the low level. In accordance with the respective signals at the respective levels, the switching MISFETs $Q_1$ to $Q_3$ and the MISFET $Q_{31}$ are rendered conductive, and the switching MISFET $Q_4$ and the MISFET $Q_{30}$ are rendered non-conductive. As a result, the capacitor $C_1$ is substantially connected in series with the battery power supply $V_{SS}$ and the capacitor $C_3$. As a result of the capacitors $C_1$ and $C_3$ being connected in series, the capacitor $C_3$ is charged not only from the control MISFET $Q_{14}$ of the voltage regulator 2 but also through the capacitor $C_1$. As a result, when the battery power supply connection is made, the rise of the voltage to be fed out to the line $l_3$ can be accelerated. At the same time, the capacitor $C_1$ is charged within a relatively short time period.

After starting state has been ended, the control signals A and $\bar{A}$ are made to have the low and high levels respectively, and the clock pulses $\phi_1$ to $\phi_3$ are consecutively changed similarly to the foregoing embodiments.

Figure 21:
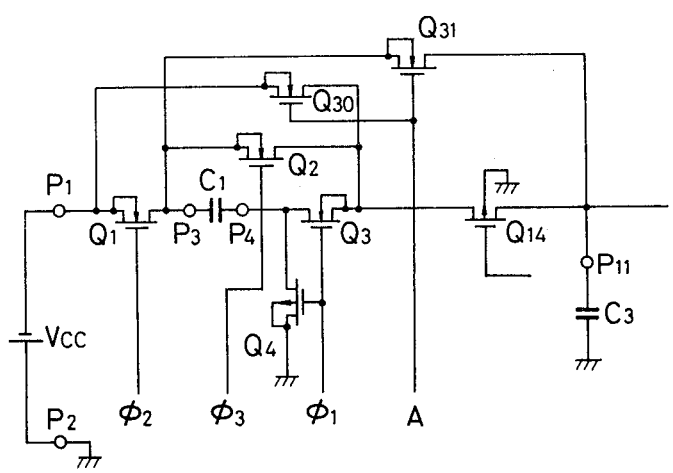

The step down circuit 1 and the voltage regulator 2 of FIGS. 14 and 16 can be further modified, as shown in FIG. 21.

In the circuit shown in FIG. 21, the clock pulses $\phi_1$ to $\phi_3$ are made to have the low level and the control signal A is made to have the high level at the starting state and upon the reduction of the battery power supply voltage, the switching MISFETs $Q_1$ to $Q_3$ are rendered non-conductive and the switching MISFET $Q_4$ and the MISFETs $Q_{30}$ and $Q_{31}$ are rendered conductive. The control MISFET $Q_{14}$ has its drain supplied through the MISFET $Q_{30}$ with the battery voltage. On the other hand, the capacitor $C_1$ is supplied through the MISFET $Q_{31}$ with the constant voltage which is fed out to the line $l_3$.

When the starting state is ended, the control signal A has the low level and the clock pulses $\phi_1$ to $\phi_3$ are consecutively changed similarly to the foregoing embodiments.

According to the circuit construction of FIG. 21, the charging and discharging paths of the capacitor $C_1$ after the starting state has been ended are constructed exclusively of the switching MISFETs $Q_1$ to $Q_4$. As a result, it is possible to prevent such voltage and power losses from being established as will take place if the MISFET $Q_{30}$ is connected in series with the charging and discharging paths of the capacitor $C_1$. Moreover, since the MISFETs $Q_{30}$ and $Q_{31}$ are operated in phase, it becomes sufficient to generate the single control signal A.

The present invention is not limited to the foregoing respective embodiments. For example, the timing pulses to be supplied to the respective step down circuits 1 may have two phases. Nevertheless, in case the starting operation is to be performed by the use of the switching means of those step down circuits or in case the step down operations are stopped by the use of those switching means, it is convenient to use three-phase timing pulses which can simultaneously render the MISFETs $Q_1$ and $Q_2$ conductive without any difficulty.

Still moreover, the circuit of FIG. 16, which makes it possible to use the battery to generate a dropped voltage, can be similarly applied to the embodiment circuits of FIGS. 1, 10, 11 and 14. Furthermore, the differential amplifier 20 of the voltage regulator 2 may be clock-driven to further reduce the current consumption. In this modification, the gate control voltage of the MISFET $Q_{14}$ is maintained by the capacitor $C_4$.

Furthermore, any known circuit for the respective circuit blocks in the foregoing embodiments may be used if it performs the operations.

Furthermore, the present invention can be widely used in such a small-sized electronic device, e.g., an analog electronic watch or digital electronic watch as is driven mainly by a battery.

What is claimed is:
1. An electronic circuit comprising:
 a first node adapted to be supplied with a power supply voltage;
 a second node;
 a step down circuit including a plurality of capacitors and a plurality of switching elements for connecting said capacitors in series during a first time period and in parallel during a second time period, said step down circuit being made receptive of the power supply voltage supplied to said first node thereby to feed out a step down voltage to said second node, said step down circuit including; a first switching element connected between said first node and a third node and adapted to be periodically turned on; a first capacitor connected between said third node and a fourth node; a second switching element connected between said fourth node and the reference potential point of said circuit and adapted to be turned on when said first switching element is not turned on; a third switching element connected between said fourth node and said second node and adapted to be turned on substantially simultaneously with said first switching element; a fourth switching element connected between said third node and said second node and adapted to be turned on substantially simultaneously with said first switching element; a fourth switching element connected between said third node and second node and adapted to be turned on substantially simultaneously with said second switching element; and a second capacitor adapted to be charged by the voltage which is supplied to said second node;

a voltage detector for detecting that said power supply voltage has dropped to a predetermined value; and a control circuit made receptive of a detection signal, which is fed out from said voltage detector, for supplying the voltage, which is supplied to said first node, to said second node, said control circuit simultaneously turning on at least said first and fourth switching elements on the basis of the output signal of said voltage detector.

2. An electronic circuit according to claim 1, further comprising a voltage regulator made receptive of the voltage, which is supplied to said second node, thereby to feed out a constant voltage to be supplied to said second capacitor.

3. An electronic circuit according to claim 2, wherein said voltage detector is so constructed as to detect the voltage at said first node when the voltage supplied to said second node becomes substantially equal to the constant output voltage of said voltage regulator.

4. An electronic circuit according to claim 3, wherein said voltage detector is made operative by the voltage which is supplied to said second node.

5. An electronic circuit according to claim 4, wherein said voltage detecting circuit is made intermittently operative.

6. An electronic circuit according to claim 1, wherein said first to fourth switching elements are constructed of insulated gate field effect transistors.

7. An electronic circuit according to claim 6: wherein said first, third and fourth switching elements are constructed of first conduction type insulated gate field effect transistors; and wherein said second switching element is constructed of such a second conduction type insulated field effect transistor as is opposite to said first conduction type.

8. An electronic circuit comprising:
a first node adapted to be supplied with a power supply voltage;
a second node;
a first switching element connected between said first node and a third and adapted to be periodically turned on;
a first capacitor connected between said third node and a fourth node;
a second switching element connected between said fourth node and the reference potential point of said circuit and adapted to be turned on when said first switching element is not turned on;
a third switching element connected between said fourth node and a fifth node and adapted to be turned on in synchronism with said first switching element;
a fourth switching element connected between said third node and said fifth node and adapted to be turned on in synchronism with said second switching element;
a voltage regulator for supplying a predetermined voltage to said second node in accordance with the voltage which is supplied to said fifth node; and
a second capacitor connected between said second node and the reference potential point of said circuit.

9. An electronic circuit according to claim 8, wherein said first capacitor is made to have a smaller capacitance than that of said second capacitor.

10. An electronic circuit according to claim 8: wherein said switching elements and said voltage regulator are constructed into a single semiconductor integrated circuit; and wherein said first and second capacitors are attached to said integrated circuit.

11. An electronic circuit according to claim 10: wherein said first, third and fourth switching elements are constructed of first conduction channel type insulated gate field effect transistors; and wherein said second switching element is constructed of a second conduction channel type insulated gate field effect transistor.

12. An electronic circuit comprising:
a first node adapted to be supplied with a power supply voltage;
a second node;
a first switching element connected between said first node and a third node and adapted to be periodically turned on;
a first capacitor having its one terminal connected with said third node and its other terminal connected with a fourth node;
a second switching element connected between said fourth node and the reference potential point of said circuit and adapted to be turned on when said first switching element is not turned on;
a third switching element connected between said fourth node and a fifth node and adapted to be turned on in synchronism with said first switching element;
a fourth switching element connected between said third node and said fifth node and adapted to be turned on in synchronism with said second switching element;
a voltage regulator for supplying a predetermined voltage to said second node in accordance with the voltage which is supplied to said fifth node;
a second capacitor connected between said second node and the reference potential point of said circuit; and
a charging circuit for charging said first capacitor with such a voltage during a predetermined time period after the power supply is made as is substantially equal to the output voltage of said voltage regulator.

13. An electronic circuit according to claim 12, wherein said charging circuit further includes: a fifth switching element inserted between said third node and one terminal of said first capacitor and adapted to be turned on, until a predetermined time period elapses after the power supply has been made, and to be thereafter turned off; and a sixth switching element connected between said one terminal of said first capacitor and said second node and adapted to be complementarily switched with respect to said fifth switching element.

14. An electronic circuit according to claim 13: wherein said switching elements and said voltage regulator are constructed into a single semiconductor integrated circuit; and wherein said first and second capacitors are attached to said semiconductor integrated circuit.

15. An electronic circuit according to claim 14: wherein said first and third to sixth switching elements are constructed of first conduction channel type insulated gate field effect transistors; and wherein said second switching element is constructed of a second conduction channel type insulated gate field effect transistor.

16. An electronic circuit according to claim 12, further comprising a third capacitor connected between said fifth node and said reference potential point.

17. An electronic circuit comprising:
a first node adapted to be supplied with a power supply voltage;
a second node;
a step down circuit including a plurality of capacitors and a plurality of switching elements for connecting said capacitors in series during a first time period and in parallel during a second time period, said step down circuit being made receptive of the power supply voltage supplied to said second node; said step down circuit including a first switching element connected between said first node and a third node; a first capacitor connected between said third node and a fourth node; a second switching element connected between said fourth node and the reference potential point of said circuit; a third switching element connected between said fourth node and said second node; a fourth switching element connected between said third node and said second node; and a second capacitor adapted to be charged in accordance with the voltage which is supplied to said second node;
a clock generator adapted to be operated by the voltage, which is supplied to said second node, thereby to feed out clock pulses for switching said switching elements, said clock generator being made operative to generate at least both a clock pulse for simultaneously turning on said first and third switching elements and a clock pulse for simultaneously turning on said second and fourth switching element and;
a level shifting circuit made receptive of the clock pulses, which are fed out of said clock generator, thereby to feed out a clock pulse at the level of said power supply voltage, which is supplied to said first node, said first to fourth switching elements being adapted to be switched by the output signal of said level shifting circuit.

18. An electronic circuit according to claim 17, further comprising a voltage generator made receptive of the voltage, which is supplied to said second node, thereby to feed out a constant voltage.

19. An electronic circuit according to claim 17, further comprising a voltage regulator made receptive of the voltage, which is supplied to said second node, thereby to feed out a constant voltage which is to be supplied to said second capacitor.

20. An electronic circuit according to claim 19, further comprising a clock circuit made receptive of the output voltage of said voltage regulator as the power supply voltage, said clock generator being made receptive of the clock pulse, which is fed out of said clock circuit, thereby to produce said clock pulses for controlling said first to fourth switching elements.

21. An electronic circuit according to claim 20, wherein said clock circuit includes an output buffer circuit made receptive of the voltage, which is supplied to said first node, as the power supply voltage.

22. An electronic circuit according to claim 20: wherein said first to fourth switching elements, said voltage regulator, said clock circuit and said clock generator are constructed into a complementary type insulated gate field effect semiconductor integrated circuit device; and wherein said first and second capacitors are attached to said complementary type insulated gate field effect semiconductor integrated circuit device.

23. An electronic circuit comprising:
a first node adapted to be supplied with a power supply voltage;
a second node;
a first switching element connected between said first node and a third node;
a first capacitor connected between said third node and a fourth node;
a second switching element connected between said fourth node and the reference potential point of said circuit;
a third switching element connected between said fourth node and said second node;
a fourth switching element connected between said third node and said second node;
a second capacitor adapted to be charged in accordance with the voltage which is supplied to said second node;
a clock generator made operative by the voltage, which is supplied from said second capacitor, to generate clock pulses partly for substantially simultaneously turning on said first and third switching elements and partly for substantially turning on said second and fourth switching elements during the time period which is different from the "ON" time period of said first and third switching elements; and
a starter for supplying the voltage, which is supplied to said first node, to said fourth node during a predetermined time period when the power supply is made.

24. An electronic circuit according to claim 23, wherein said starter is made operative to feed out signals for simultaneously turning on at least said first and fourth switching elements for said predetermined time period when said power supply is made.

25. An electronic circuit according to claim 23, further comprising an oscillator made receptive of the voltage, which is fed out of said second capacitor, as the power supply voltage, said clock generator being made receptive of the signal, which is generated on the basis of the oscillating output of said oscillator, as a reference clock signal, and said starter being adapted to have its operation controlled in accordance with the oscillating operation of said oscillator.

26. An electronic circuit according to claim 23, further comprising: an oscillator made receptive of the voltage, which is fed out of said second capacitor, as the power supply voltage; a frequency divider made receptive of the output signal of said oscillator; and an oscillation detector for detecting the oscillating operation of said oscillator, said starter including a latch circuit adapted to be rendered to a first state by the output signal of said oscillation detector, when the power supply is made, and to a second state by the signal, which is thereafter fed out of said frequency divider.

27. An electronic circuit according to claim 26, further comprising a voltage regulator made receptive of the voltage, which is supplied to said second node, thereby to feed out a constant voltage to be supplied to said oscillator and said frequency divider.

28. An electronic circuit according to claim 27, further comprising an output buffer circuit made receptive of the voltage, which is supplied to said first node, as the power supply voltage.

29. An electronic circuit according to claim 28: wherein said first to fourth switching elements, said clock generator, said starter, said oscillator, said frequency divider, said oscillation detector, said voltage regulator and said output buffer circuit are constructed into a complementary type insulated gate field effect semiconductor integrated circuit device; and wherein said first and second capacitors are attached to said complementary type insulated gate field effect semiconductor integrated circuit device.

30. An electronic circuit according to claim 29, wherein said first node is supplied with the voltage of a battery.

31. An electric circuit comprising:
a first node adapted to be supplied with a power supply voltage;
a second node;
a first switching insulated gate field effect transistor connected between said first node and a third node;
a first capacitor connected between said third node and fourth node;
a second switching insulated gate field effect transistor connected between said fourth node and the reference potential point of said circuit;
a third switching insulated gate field effect transistor connected between said third node and second node;
a second capacitor adapted to be charged in accordance with the voltage which is supplied to said second node;
a clock generator for generating a first clock pulse, which is supplied to gates of said second and third switching insulated gate field effect transistors for complementally turning on and off the second and third switching insulated gate field effect transistors, a second clock pulse, which is supplied to a gate of said first switching insulated gate field effect transistor for turning on the first switching insulated gate field effect transistor duuring a first time period, the turning on of the first insulated gate field effect transistor being delayed a predetermined time period from the turning on of said third switching insulated gate field effect transistor and the turning off of the first insulated gate field effect transistor being advanced a predetermined time period compared to the turning off of said third switching insulated gate field effect transistor, and a third clock pulse, which is supplied to a gate of said fourth switching insulated gate field effect transistor for turning on the fourth insulated gate field effect transistor during a second time period, the turning on of the fourth field effect transistor being delayed a predetermined time period from the turning off of said third switching insulated gate field effect transistor and the turning off of the fourth insulated gate field effect transistor being advanced a predetermined time period compared to the turning on of said fourth switching insulated gate field effect transistor; and
a load circuit made receptive of at least the voltage, which is supplied to said second node, as the power supply voltage.

* * * * *